(12) United States Patent
Jeung

(10) Patent No.: US 8,049,447 B2
(45) Date of Patent: Nov. 1, 2011

(54) ELECTRIC MOTOR WITH POWER SUPPLY CIRCUIT SUPPLYING ISOLATED ELECTRIC POWER

(75) Inventor: Young-Chun Jeung, Cypress, CA (US)

(73) Assignee: SNTech Inc., Phoenix, AZ (US)

( * ) Notice: Subject to any disclaimer, the term of this patent is extended or adjusted under 35 U.S.C. 154(b) by 0 days.

(21) Appl. No.: 12/901,412

(22) Filed: Oct. 8, 2010

(65) Prior Publication Data

US 2011/0025245 A1    Feb. 3, 2011

Related U.S. Application Data

(63) Continuation of application No. 12/397,227, filed on Mar. 3, 2009, now Pat. No. 7,812,556, which is a continuation-in-part of application No. 12/041,580, filed on Mar. 3, 2008, now Pat. No. 7,795,827.

(60) Provisional application No. 61/059,596, filed on Jun. 6, 2008.

(51) Int. Cl.
    *H02P 6/16* (2006.01)
(52) U.S. Cl. ............. 318/400.04; 318/400.09; 238/44 A
(58) Field of Classification Search .......... 318/400.04, 318/400.09, 34; 236/44 A; 238/44 A
    See application file for complete search history.

(56) References Cited

U.S. PATENT DOCUMENTS

| 3,299,335 | A |   | 1/1967  | Wessels |
|-----------|---|---|---------|---------|
| 3,444,406 | A |   | 5/1969  | Aha     |
| 3,457,486 | A |   | 7/1969  | Soeda   |
| 3,531,702 | A |   | 9/1970  | Hill    |
| 3,604,960 | A |   | 9/1971  | Krestel |
| 3,787,014 | A |   | 1/1974  | Story et al. |
| 3,878,809 | A |   | 4/1975  | Ray     |
| 4,004,202 | A |   | 1/1977  | Davis   |
| 4,384,224 | A |   | 5/1983  | Spitler et al. |
| 4,544,856 | A |   | 10/1985 | King    |
| 4,642,885 | A |   | 2/1987  | King    |
| 4,668,898 | A |   | 5/1987  | Harms et al. |
| 4,712,030 | A |   | 12/1987 | Lakin et al. |
| 4,774,448 | A |   | 9/1988  | Yoshitomi |
| 4,888,530 | A |   | 12/1989 | Radik et al. |
| 5,492,273 | A | * | 2/1996  | Shah .......................... 236/44 A |
| 5,592,058 | A | * | 1/1997  | Archer et al. ............ 318/400.09 |
| 5,818,194 | A |   | 10/1998 | Nordby  |
| 6,035,265 | A |   | 3/2000  | Dister et al. |
| 6,310,452 | B1 |  | 10/2001 | Deck et al. |
| 7,042,180 | B2 |  | 5/2006  | Terry et al. |
| 7,057,376 | B2 |  | 6/2006  | Cook et al. |

(Continued)

FOREIGN PATENT DOCUMENTS

JP    6-30590 A    2/1994

(Continued)

*Primary Examiner* — Paul Ip
(74) *Attorney, Agent, or Firm* — Knobbe Martens Olson & Bear LLP

(57) ABSTRACT

Circuitry for controlling motors, such as a brushless motor (BLM), is disclosed. The circuitry may comprise one or more inputs for receiving rotor position signals from one or more Hall effect sensors that detect the position of, for example, a BLM rotor. The circuitry may also comprise an input for receiving a pulse width modulated speed control signal. The circuitry generates one or more drive signals, each of which may comprise a logical combination (e.g., a logical AND combination) of the speed control signal and a rotor position signal, for controlling power switches that are coupled to electromagnets of the BLM.

9 Claims, 13 Drawing Sheets

U.S. PATENT DOCUMENTS

| | | |
|---|---|---|
| 7,176,658 B2 | 2/2007 | Quazi et al. |
| 7,268,505 B2 | 9/2007 | Pant et al. |
| 7,296,753 B1 | 11/2007 | Zucker |
| 7,327,118 B2 | 2/2008 | Pant et al. |
| 7,378,821 B2 | 5/2008 | Simpson, III |
| 7,466,089 B2 | 12/2008 | Beifus |
| 7,719,214 B2 * | 5/2010 | Leehey et al. .......... 318/34 |
| 7,795,827 B2 | 9/2010 | Jeung |
| 7,812,556 B2 | 10/2010 | Jeung |
| 2002/0047348 A1 | 4/2002 | Ohiwa et al. |
| 2003/0001442 A1 | 1/2003 | Hsu |
| 2003/0080772 A1 | 5/2003 | Giacomini et al. |
| 2003/0173924 A1 | 9/2003 | Blase et al. |
| 2004/0232871 A1 | 11/2004 | Deck et al. |
| 2005/0029976 A1 | 2/2005 | Terry et al. |
| 2005/0162108 A1 | 7/2005 | Pant et al. |
| 2005/0253744 A1 | 11/2005 | Kern |
| 2006/0244333 A1 | 11/2006 | Jeung |
| 2007/0024250 A1 | 2/2007 | Simpson, III |
| 2007/0184339 A1 | 8/2007 | Scheucher |
| 2007/0274113 A1 | 11/2007 | Wang et al. |
| 2008/0053716 A1 | 3/2008 | Scheucher |
| 2008/0286088 A1 | 11/2008 | Chen et al. |
| 2008/0313884 A1 | 12/2008 | Jeung |
| 2008/0315691 A1 | 12/2008 | Jeung |
| 2009/0218971 A1 | 9/2009 | Jeung |
| 2009/0224709 A1 | 9/2009 | Jeung |
| 2009/0284201 A1 | 11/2009 | Jeung |
| 2010/0157638 A1 | 6/2010 | Naiknaware et al. |

FOREIGN PATENT DOCUMENTS

| | | |
|---|---|---|
| KR | 10-0696854 B1 | 3/2007 |
| WO | WO 2009/140419 A2 | 11/2009 |

* cited by examiner (A) 2+3 PHASE COMBINED MOTOR (B) 2 PHASE MOTOR

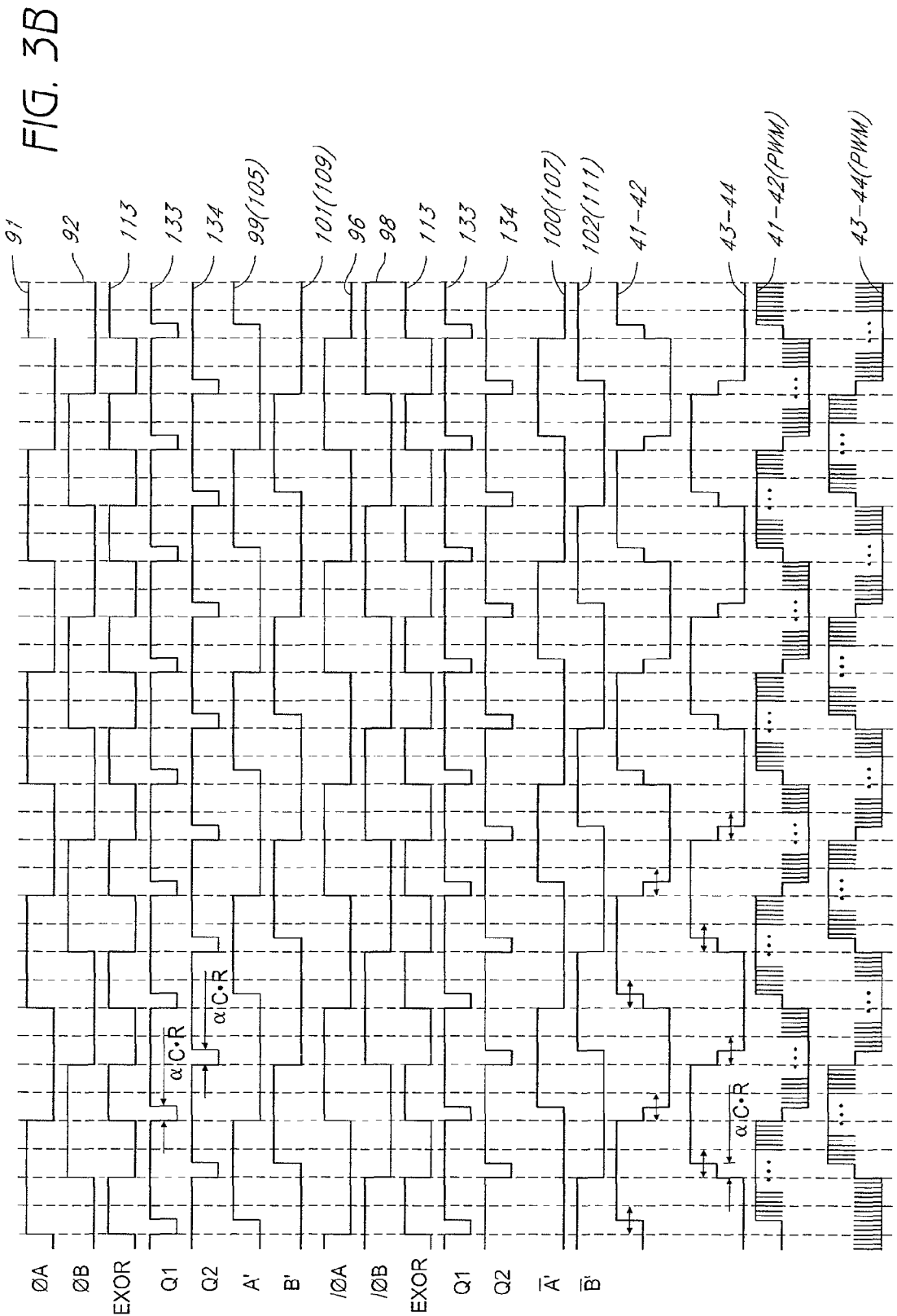

First State

Second State

First State

Second State

ELECTRIC MOTOR WITH POWER SUPPLY CIRCUIT SUPPLYING ISOLATED ELECTRIC POWER

RELATED APPLICATIONS

This application is a continuation application of U.S. patent application Ser. No. 12/397,227, filed Mar. 3, 2009, which is a continuation-in-part of U.S. patent application Ser. No. 12/041,580, filed Mar. 3, 2008, now U.S. Pat. No. 7,795,827 and also is a non-provisional application of U.S. Provisional Patent Application 61/059,596, filed Jun. 6, 2008. Each of the foregoing applications is hereby incorporated herein by reference in its entirety and is to be considered part of this specification.

BACKGROUND

1. Technical Field

The disclosure relates to circuitry for controlling a brushless motor (hereinafter referred to as a "BLM").

2. Description of the Related Art

Recently, a BLM for driving a blower or a fan for an HVAC, or a pump has been widely used. The use of a BLM is closely related to home and work environments in daily life, including apartments, offices, or factories, etc. A motor for a blower or a fan for an HVAC, or a pump has a significant amount of electric power consumption, which may range from several times to several ten times the amount used in different fields such as, e.g., the field of industrial mechanical devices or machine tools, etc., due in part because such a motor is required to be operated continuously for typically at least several hours or more per day. Therefore, a motor for a blower or a fan for an HVAC, or a pump, which requires a long time or a continuous operation, has a very large amount of energy consumption. Particularly, the electric power consumption required for driving a blower or a fan for an HVAC, or a pump takes a very large portion in a BLM. Further, the use of a BLM affects directly the efficiency and performance of a driving system for an HVAC or a pump.

Accordingly, a motor having high-efficiency for saving energy has been required, and a development of an intelligent control system capable of controlling a motor having high-efficiency conveniently and stably has been required.

In the past, an AC induction motor with an inexpensive and simple structure has been mainly used as a motor having high-efficiency. However, there is a problem that causes an unnecessary over-speed operation and hence a significant loss of electric power because this AC induction motor is difficult to control. For example, it is difficult to control a speed necessarily required for providing an energy saving and convenient operation conditions. Meanwhile, the AC induction motor has used a separate inverter in order to solve this kind of problem. However, the use of a separate inverter causes a noise problem, and has a certain limit in providing a program suitable for various required operation conditions, in addition to a speed controlling, due to a low operation efficiency in terms of economic efficiency (an energy consumption amount compared to costs).

Further, motors for driving a fan using a BLM or an electrically commuted motor (hereinafter referred to "ECM") have recently been practiced. However, the motors for driving a fan using an ECM are designed to be used mainly as motors for driving simply a compact or low-capacity fan with 100 Watts or less, and thus have a limit in that they are not suitable for an HVAC designed for the use of a high-capacity housing or industrial purpose.

In the meanwhile, technologies relating to an apparatus and a method for controlling an ECM used for an HVAC with a housing and industrial purpose are disclosed in U.S. Pat. No. 5,592,058 (hereinafter referred to "'058 patent") allowed to William R. Archer, et al. and entitled "Control System and Methods for a Multi-parameter Electronically Commutated Motor." However, because the control system and methods for a multi-parameter electronically commutated motor disclosed in '058 patent use AC half waves as input signals for various system parameters, use a separate programmable memory for storing the various system parameters, and use separately a complicated circuit such as ASIC, which is used with being connected to a means for sensing a position of a rotor and a current control circuit, the '058 patent has a problem in that an overall system and controlling processes are complicated.

Further, in the control system and methods for the multi-parameter electronically commutated motor disclosed in the '058 patent, since a microprocessor controls an ECM depending on parameter signals pre-stored in the programmable memory, it is impossible to respond properly in real time when, for example, an abnormal operation condition may occur.

Still further, in the control system and methods for the multi-parameter electronically commutated motor disclosed in the '058 patent, the means for sensing the position of a rotor may be made in a sensor-less manner. However, in case of sensing a position of a rotor using this sensor-less manner, there are problems that an unstable transient phenomenon may occur at a startup of the ECM and a high possibility of a mal-operation may occur due to a vulnerability to an electromagnetic noise.

In the meanwhile, conventional control systems of a motor do not have means capable of controlling efficiently a system for driving various kinds of blowers or fans for an HVAC, or a pump, such as means or functions including a non-regulated speed control (NRS) operation function, a regulated speed control (RS) operation function, a constant torque control function, a constant air flow/constant liquid flow control function, a remote communication and monitoring function, a network control means or function capable of controlling a drive of multiple fans or pumps using a mod bus, and a data logging means or function capable of checking operation states or records of a control system for an HVAC or a pump.

Moreover, conventional control systems of a motor have a problem in that they cannot provide the functions described by a single integrated control circuit and program.

The foregoing discussion is to provide background information and does not constitute an admission of prior art.

SUMMARY

An electronic circuit for controlling a brushless motor (BLM) is disclosed. In some embodiments, the electronic circuit comprises: first and second inputs for respectively receiving first and second digital position signals from first and second Hall effect sensors, the first and second Hall effect sensors for detecting the angular position of a BLM rotor; a third input for receiving a digital pulse width modulated speed control signal; a first logic gate for generating a first drive signal that comprises a logical combination of the first digital position signal and the speed control signal; and a second logic gate for generating a second drive signal that comprises a logical combination of the second digital position signal and the speed control signal.

In some embodiments, an electronic circuit for controlling a brushless motor (BLM) comprises: a first input to receive a first position signal from a first sensor that detects the angular position of magnetic poles on a BLM rotor, the first position signal having active periods and inactive periods; a second input to receive a second position signal from a second sensor that detects the angular position of magnetic poles on the BLM rotor, the second position signal having active periods and inactive periods; control circuitry to receive the first position signal, the second position signal, and a speed control signal, and to generate first and second drive signals based on the position and speed control signals, wherein the first and second drive signals each comprise a plurality of inactive periods that correspond to the respective inactive periods of the first and second position signals, and wherein the first and second drive signals each further comprise a plurality of pulses that correspond to each of the respective active periods of the first and second position signals, a first bridge configuration of switches for receiving the first drive signal, and for coupling a power source to a first drive output during each of the plurality of pulses of the first drive signal; and a second bridge configuration of switches for receiving the second drive signal, and for coupling the power source to a second drive output during each of the plurality of pulses of the second drive signal.

An electronic method for controlling a brushless motor (BLM) is disclosed. In some embodiments, the electronic method comprises: receiving first and second digital position signals from respective first and second Hall effect sensors, the first and second Hall effect sensors for detecting the angular position of magnetic north poles on a BLM rotor; receiving a digital pulse width modulated speed control signal; generating a first drive signal that comprises a logical combination of the first digital position signal and the speed control signal, the first drive signal for controlling a first set of one or more power switches communicatively coupled to a first set of one or more BLM electromagnets; and generating a second drive signal that comprises a logical combination of the second digital position signal and the speed control signal, the second drive signal for controlling a second set of one or more power switches communicatively coupled to a second set of one or more BLM electromagnets.

BRIEF DESCRIPTION OF THE DRAWINGS

FIG. 3B illustrates a second set of example signal waveforms in the phase logic control circuit during various phases of rotation of the BLM rotor according to some embodiments.

DETAILED DESCRIPTION OF EMBODIMENTS

Figure 1:
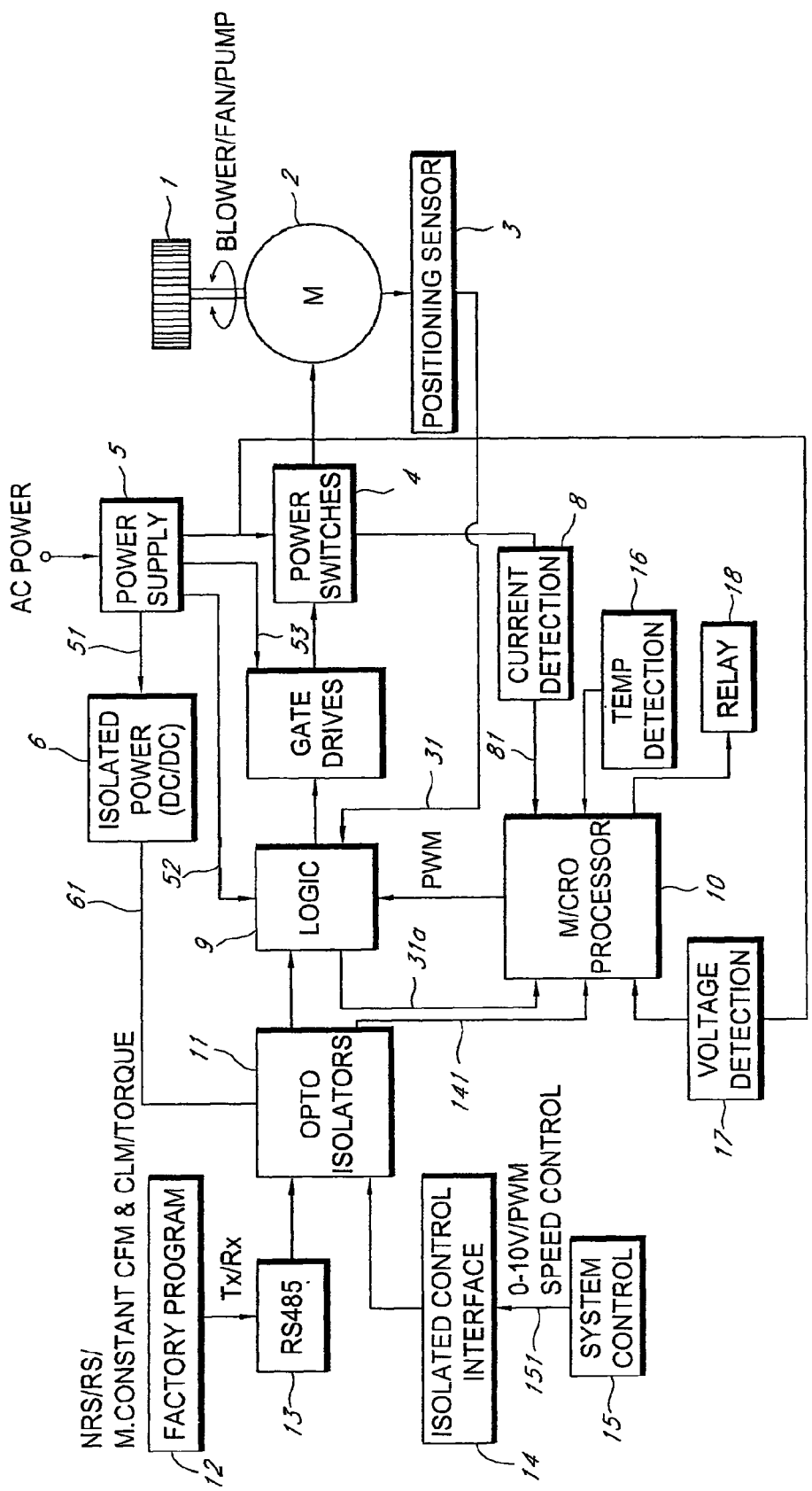
FIG. 1 is a block diagram of a control system for controlling a brushless motor according to one embodiment.

In some embodiments there is a control system for controlling a motor for an HVAC or a pump, where a microprocessor receives multiple control signals for controlling a motor for an HVAC or a pump and controls them in real time.

In some embodiments there is a control system for controlling a motor for an HVAC or a pump, which is capable of sensing abrupt load variation of a motor and thus procuring stability and capable of protecting the motor and the control system from a change of an environmental temperature or an abnormal temperature change of the motor itself.

Further, there is a control system for controlling a motor for an HVAC or a pump, which has a built-in isolated power supply to be used for a control system for controlling external inputs and thus is capable of accessing easily various control command signals relating to a master control system of the motor for an HVAC or a pump, even without a separate external power supply source.

Further, in some embodiments there is a control system for controlling a motor for an HVAC or a pump having an opto-isolated communication means capable of transmitting and receiving various control program data and a means where a DC voltage signal (Vdc) or a pulse modulation signal to be used as a control signal for controlling a speed of the motor can be inputted therein through one input port and processed accordingly.

According to some embodiments, there is a control system for controlling a motor for a heating, ventilation and air conditioning unit (HVAC) or a pump comprising: an opto-isolated speed command signal processing interface into which a signal for controlling a speed of the motor is inputted and which outputs an output signal for controlling the speed of the motor being transformed as having a specific single frequency; a communication device into which a plurality of operation control commands of the motor; an opto-isolated interface for isolating the plurality of operation control commands inputted through the communication device and the transformed output signal for controlling the speed of the motor, respectively; a microprocessor, being connected to the opto-isolated interface, for outputting an output signal for controlling an operation of the motor depending on the plurality of operation control commands and the transformed output signal for controlling the speed of the motor; a sensor, being connected to the motor, for outputting a rotor position sensing signal of the motor; a logic control circuit, being connected to the opto-isolated interface, the microprocessor, and the sensor, respectively, for adding the rotor position sensing signal and the output signal for controlling the operation of the motor; a power switch circuit being connected to feed electric power to the motor; a gate drive circuit, being connected to the logic control circuit and the power switch circuit, respectively, for driving the power switch circuit; and a power supply device being connected to the logic control circuit, the power switch circuit, and the gate drive circuit, respectively, for feeding electric power thereto.

Various features of embodiments provide many advantages, including:

1. Various operation controls required in a motor for an HVAC or a pump may be made in real time.

2. Operation efficiency of a motor for an HVAC or a pump is significantly enhanced so that it is possible to operate a motor at low consumption of electric power and in a various and intelligent manner.

3. A control system of a motor for an HVAC or a pump may be embodied with a simple configuration.

4. It is convenient to use a control system of a motor for an HVAC or a pump because a separate built-in power supply device for feeding an external power supply is included therein.

5. It is possible to monitor any troubles, operation efficiency, and a condition on a stable operation of an HVAC or a pump in real time since various operation data information (e.g., operation current, voltage, speed, and temperature, etc. which are processed by a control system of a motor for an HVAC or a pump in some embodiments) is possible to be transmitted to an external system.

Further features and advantages can be obviously understood with reference to the accompanying drawings where same or similar reference numerals indicate same components.

Hereinafter, embodiments are described in more detail with reference to the preferred embodiments and appended drawings.

Figure 2A:
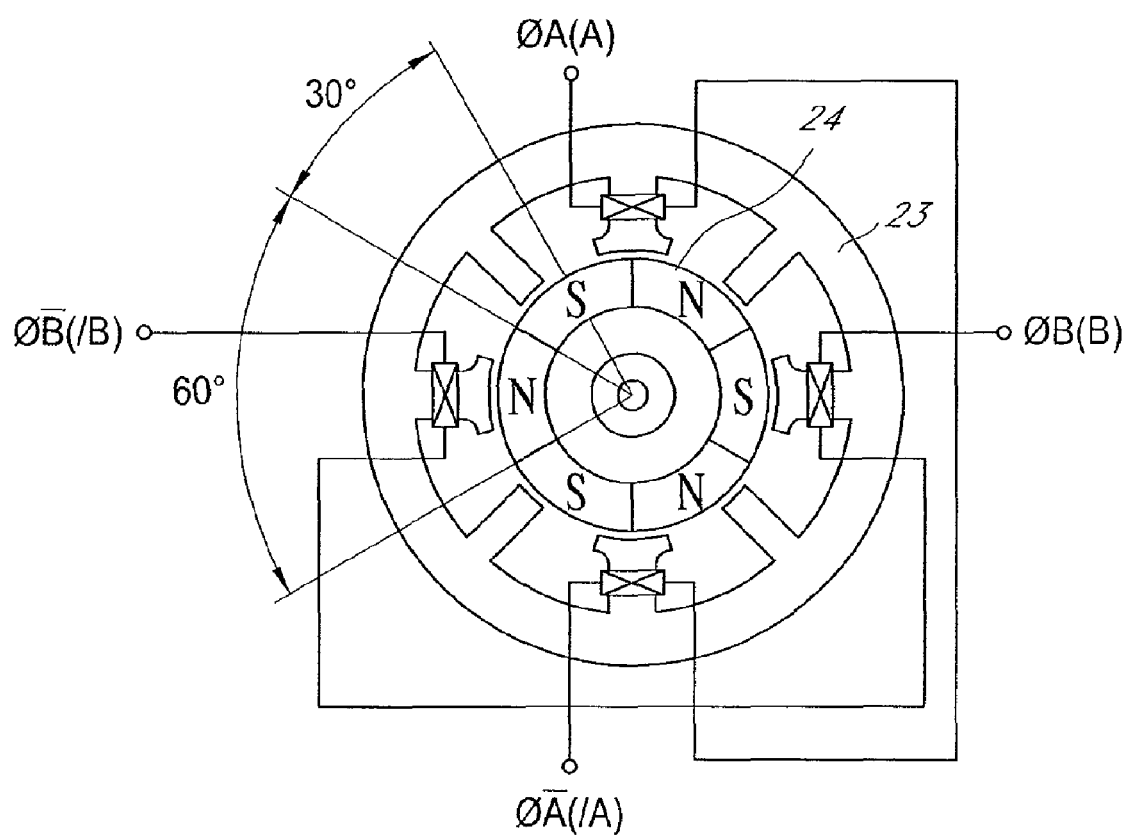
FIG. 2a is a cross-section view of a 2 phase and 3 phase combined type brushless motor being used in one embodiment illustrated in FIG. 1.
Figure 2B:
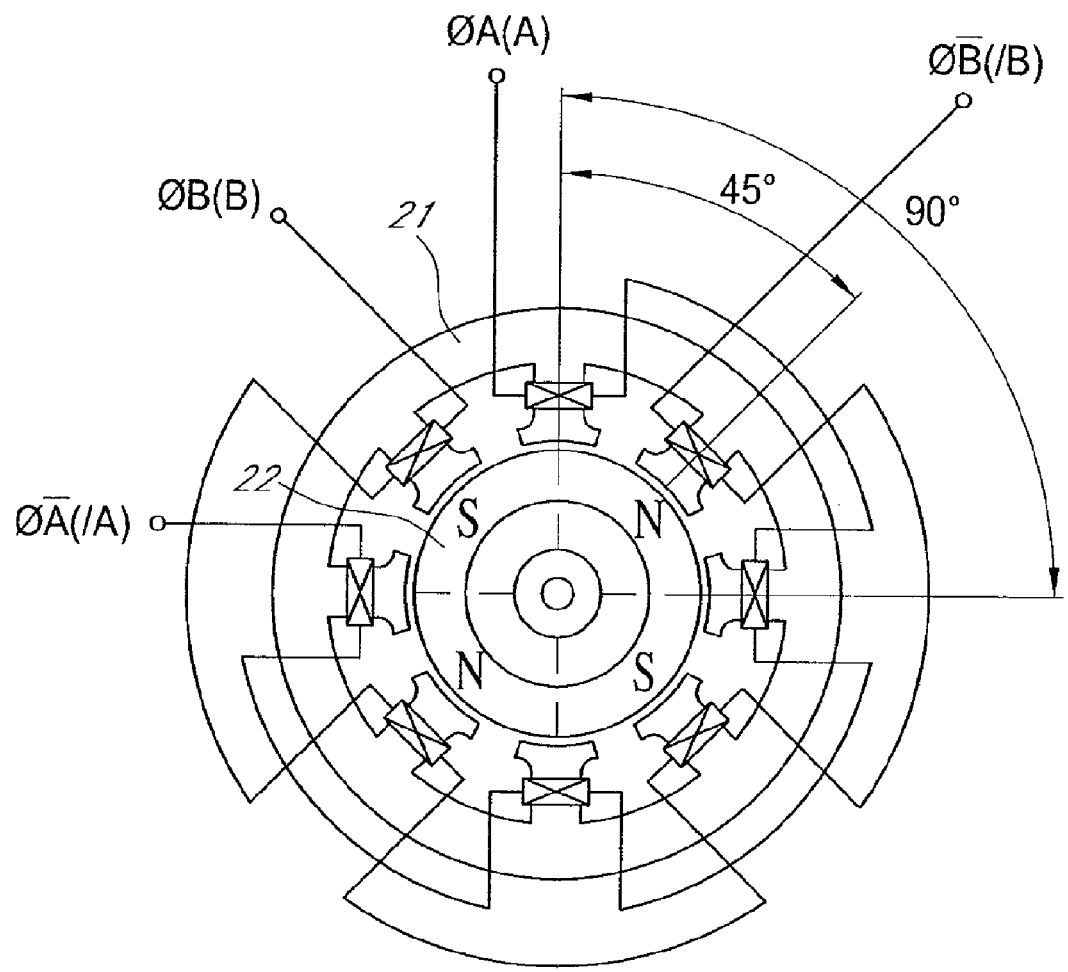
FIG. 2b is a cross-section view of a conventional 2 phase brushless motor being used in one embodiment illustrated in FIG. 1.

FIG. 1 is a block diagram of a control system for controlling a brushless motor according to one embodiment, FIG. 2a is a cross-section view of a 2 phase and 3 phase combined type brushless motor being used in one embodiment illustrated in FIG. 1, and FIG. 2b is a cross-section view of a conventional 2 phase brushless motor being used in one embodiment illustrated in FIG. 1.

Referring to FIG. 1, a 2 phase and 3 phase combined type brushless ECM illustrated in FIG. 2a or a conventional 2 phase brushless ECM illustrated in FIG. 2b may be used as a motor 2 to be controlled by a control system for an HVAC or a pump. The 2 phase and 3 phase combined type brushless ECM illustrated in FIG. 2a is a motor where a 2 phase armature and a 3 phase rotor are combined. More specifically, a specific structure and operations of the 2 phase and 3 phase combined type brushless ECM illustrated in FIG. 2a is disclosed in more detail in Korean Patent No. 653434 (hereinafter referred to "434 patent") registered on Jan. 27, 2006, entitled "Brushless DC motor," which was filed on Apr. 29, 2005 as Korean Patent Application No. 10-2005-0035861 by the present inventor and applicant. The disclosure of '434 patent is incorporated herein by reference. Because one purpose of some embodiments is to provide a control system for controlling the 2 phase and 3 phase combined type brushless ECM illustrated in FIG. 2a or the conventional 2 phase brushless ECM illustrated in FIG. 2b and the motors illustrated in FIGS. 2a and 2b are all known, the specific structures and operations of the 2 phase and 3 phase combined type brushless ECM illustrated in FIG. 2a and the conventional 2 phase brushless ECM illustrated in FIG. 2b will not be described in detail in the present specification. Moreover, although a control system according to some embodiments is described to be applied to the conventional 2 phase and 3 phase combined type brushless ECM and 2 phase brushless ECM in an exemplary manner, a skilled person in the art may fully understand that a control system according to some embodiments shall be used to control a single phase ECM or a typical ECM.

Referring back to FIG. 1, a motor 2 may be used for driving a blower or a fan used for an HVAC, or driving a pump (hereinafter "a blower or a fan" and "a pump" may be refereed to commonly as "a pump"). A control system for controlling a motor 2 for a pump 1 according to some embodiments comprises an opto-isolated speed command signal processing interface 14 into which a signal for controlling a speed of the motor 2 is inputted and which outputs an output signal for controlling the speed of the motor 2 being transformed as having a specific single frequency; a communication device 13 into which a plurality of operation control commands of the motor 2; an opto-isolated interface 11 for isolating the plurality of operation control commands inputted through the communication device 13 and the transformed output signal for controlling the speed of the motor 2, respectively; a microprocessor 10, being connected to the optoisolated interface 11, for outputting an output signal for controlling an operation of the motor 2 depending on the plurality of operation control commands and the transformed output signal for controlling the speed of the motor 2; a sensor 3, being connected to the motor 2, for outputting a rotor position sensing signal of the motor 2; a logic control circuit 9, being connected to the opto-isolated interface 11, the microprocessor 10, and the sensor 3, respectively, for adding the rotor position sensing signal and the output signal for controlling the operation of the motor 2; a power switch circuit 4 being connected to feed electric power to the motor 2; a gate drive circuit 7, being connected to the logic control circuit 9 and the power switch circuit 4, respectively, for driving the power switch circuit 4; and a power supply device 5 being connected to the logic control circuit 9, the power switch circuit 4, and the gate drive circuit 7, respectively, for feeding electric power thereto. Herein below, all elements and their cooperative relationships of a control system for controlling a motor 2 for a pump 1 according to some embodiments will be described in more detail between the First, a control system for a pump 1 according to some embodiments includes an opto-isolated speed command signal processing interface 14. The opto-isolated speed command signal processing interface 14 is connected to a central control system 15. Further, the an opto-isolated speed command signal processing interface 14 may have a separate built-in microprocessor (see reference numeral 146 illustrated in FIG. 6) which outputs a pulse width modulation (PWM) signal for controlling a speed being transformed to a specific single frequency (e.g., 80 Hz frequency according to some embodiments) and maintained the transformed specific frequency. Therefore, the opto-isolated speed command signal processing interface 14 may process a control signal comprised of either a DC voltage signal (0-10 Vdc) 151 or a PWM signal 151 for controlling a speed of the motor 2, as well as a start-up signal and a stop signal, all of which are transmitted either from the central control system 15 or manually. Especially, even if the PWM signal 151 may have a large frequency variation width (40 Hz-120 Hz), the PWM signal 151 may feed a PWM output signal having a specific single frequency (e.g., a constant frequency of 80 Hz), regardless of the large frequency variation width (40 Hz-120 Hz). In this case, the optoisolated speed command signal processing interface 14 may transform the PWM signal 151 for controlling a speed having a large frequency variation width (40 Hz-120 Hz) to a specific single frequency (e.g., 80 Hz according to some embodiments) by using the separate microprocessor 146 (see FIG. 6). The opto-isolated speed command signal processing interface 14 is connected to the microprocessor 10 through the opto-isolated interface 11. Thus, the DC voltage signal (0-10 Vdc) 151 or the PWM signal 151 for controlling a speed of the motor 2 is fed to the microprocessor 10 as a PWM signal which is transformed to a specific single frequency (e.g., 80 Hz) by the opto-isolated speed command signal processing interface 14 (hereinafter referred to "a transformed output signal 151 for controlling a speed of the motor").

Further, a control system for a pump 1 according to some embodiments includes a communication device such as RS485 13. RS485 13 is connected to a factory program device 12 including a pre-determined program which is programmable by a user. The factory program device 12 may be embodied, for example, by a personal computer (PC). The pre-determined program included in the factory program device 12 may be a program including at least one or more operation control commands consisting of a plurality of operation control commands relating to, for example, NRS, RS, constant torque, constant air flow/constant liquid flow, and a clockwise (CW) rotation/counter-clockwise (CCW) rotation of the motor 2. In an alternative embodiment, an operation control command relating to a CW/CCW rotation of the motor 2 may be inputted through RS485 13, for example, by a separate toggle switch.

Hereinbelow, specific details of functions and programs necessary for operating an HVAC and a pump according to some embodiments will be described in more detail.

Referring to FIG. 1 again, an NRS control may be performed in an NRS firmware program mode which is pre-determined in the microprocessor 10. That is, when an NRS control command is inputted into the microprocessor 10 through the RS485 13 and the opto-isolated interface 11, from the factory program device 12 which is programmable by a user, the microprocessor 10 is switched to an NRS firmware program mode which is pre-determined in the microprocessor 10. In this NRS firmware program mode, the microprocessor 10 either transforms a PWM output signal to Low or zero (0), or modulates a pulse width of the PWM output signal increasingly or decreasingly at a constant rate, and the switched or modulated PWM output signal is transmitted to the 2 phase logic control circuit 9. This may result in that the motor 2 may stop or perform an NRS operation such as a simple speed-variable operation, etc.

A RS control may be performed in a NRS firmware program mode which is pre-determined in the microprocessor 10. That is, when a RS control command is inputted into the microprocessor 10 through the RS485 13 and the opto-isolated interface 11, from the factory program device 12 which is programmable by a user, the microprocessor 10 is switched to a RS firmware program mode which is pre-determined in the microprocessor 10. In this RS firmware program mode, the microprocessor 10 compares and calculates the transformed output signal 151 for controlling a speed of the motor being fed by the opto-isolated speed command signal processing interface 14 and an input signal 31a which is sensed by the sensor 3 for sensing a rotor position and is outputted through the 2 phase logic control circuit 9. Thereafter, the microprocessor 10 modulates a pulse width of the PWM output signal increasingly or decreasingly corresponding to a comparison and calculation result to maintain a constant speed which is commanded to the motor 2, and the modulated PWM output signal is transmitted to the 2 phase logic control circuit 9. Thus, it is possible that the motor 2 performs an RS operation which maintains a constant rotational speed, although a variance in DC voltage 54 fed from a power supply device 5 or a load variance of the pump 1 may occur.

A constant torque control may be performed in a constant torque firmware program mode which is pre-determined in the microprocessor 10. That is, when a constant torque control command is inputted into the microprocessor 10 through the RS485 13 and the opto-isolated interface 11, from the factory program device 12 which is programmable by a user, the microprocessor 10 is switched to a constant torque firmware program mode which is pre-determined in the microprocessor 10. In this constant torque firmware program mode, the microprocessor 10 modulates a pulse width of the PWM output signal increasingly or decreasingly to vary the speed of the motor 2 and the modulated PWM output signal is transmitted to the 2 phase logic control circuit 9. More specifically, the microprocessor 10 compares a pre-determined current value and a load current value 81 of the motor 2 being fed by a current detection circuit 8. Depending on the comparison result, the microprocessor 10 increases or decreases the pulse width of the PWM output signal for the load current value 81 of the motor 2 to maintain the predetermined current value constantly. As a result, the speed of the motor increases until the motor 2 reaches at a constant torque value when the load current value 81 is decreased, while the speed of the motor decreases until the motor 2 reaches at a constant torque value when the load current value 81 is increased. In this manner, it is possible to perform a constant torque operation maintaining a constant torque.

A constant air flow/constant liquid flow control may be performed in a constant air flow/constant liquid flow control firmware program mode which is pre-determined in the microprocessor 10. That is, when a constant air flow/constant liquid flow control command is inputted into the microprocessor 10 through the RS485 13 and the opto-isolated interface 11, from the factory program device 12 which is programmable by a 16 user, the microprocessor 10 is switched to a constant air flow/constant liquid flow firmware program mode which is pre-determined in the microprocessor 10. In this constant air flow/constant liquid flow firmware program mode, the microprocessor 10 modulates the PWM output signal calculated as a function value proportional to the speed and current of the motor 2 which is necessary for maintaining a constant air flow/constant liquid flow, depending on a condition determined by an input of the factory program device 12 regardless of the transformed output signal 151 for controlling a speed of the motor. The modulated PWM output signal is transmitted to the 2 phase logic control circuit 9 so that it is possible to perform a constant air flow/constant liquid flow operation. The technologies relating to performing a constant air flow/constant liquid flow operation control is disclosed in more detain in Korean Patent Application No. 10-2007-0122264, entitled "Apparatus to control a multi programmable constant air flow with speed controllable brushless motor," which was filed on Nov. 11, 2007 by the present applicant. The disclosure of Korean Patent Application No. 10-2007-0122264 is incorporated herein by reference.

Meanwhile, a control system for controlling the pump 1 according to some embodiments includes the microprocessor 10. A position signal 31 sensed from the sensor 3 for sensing a rotor position is inputted into the 2 phase logic control circuit 9, and then the 2 phase logic control circuit 9 outputs an input signal 31a of a rotational speed into the microprocessor 10. The microprocessor 10 may calculate an RPM of the motor 2 by using the input signal 31a of a rotational speed. The microprocessor 10 also receives a load current signal of the motor 2 through the power switching circuit 4 and 17 the current detection circuit 8 and calculates a load current value of the motor 2. Further, the microprocessor 10 has a control program which makes the motor 2 to operate depending on a modulation rate of the transformed output signal 151 (typically, 80 Hz) for controlling a speed of the motor fed from the an opto-isolated speed command signal processing interface 14, in a manner that the motor 2 stops at the modulation rate of 0-5% and is operated with a varying speed at the modulation rate of 5-100%. For this purpose, the microprocessor 10 also outputs the PWM output signal (frequency: 20 KHz or more), which may vary the speed of the motor 2, to the phase logic control circuit 9. Further, the microprocessor 10 may receive a temperature signal of the motor 2 detected by a temperature detection sensor 16, and makes the motor 2 to stop the operation or decrease the speed thereof when the detected temperature becomes a constant temperature value or more. Further, the microprocessor 10 may receive a DC voltage 54 fed from the power supply device 5 and detected by a voltage detection circuit 17, and makes the motor 2 to stop the operation or makes a warning signal when the received DC voltage 54 becomes higher or lower than a pre-determined voltage value. Further, the microprocessor 10 may have a firmware program which may output a signal for driving a relay switch 18 to make a notice to an external user of an abnormal operation condition, in case that the microprocessor 10 decides the abnormal operation condition by determining an operation speed, current, voltage, and temperature, etc. of the motor 2, separately ort integrally.

Further, a control system for controlling the pump 1 according to some embodiments includes the 2 phase logic control circuit 9. The 2 phase logic control circuit 9 is connected to the gate drive circuit 7. The gate 18 drive circuit 7 is connected to the power switch 4 and may drive the power switch 4. The power switch 4 is connected to the motor 2 and feeds the DC voltage 54 fed from the power supply device 5 to motor coils (ØA, ØB) (see FIG. 2) in a switching manner. The 2 phase logic control circuit 9 adds the rotor position sense signal 31 outputted from a Hall sensor 3 for sensing a position of the rotor and the PWM output signal having a frequency of 20 KHz or more fed from the microprocessor 10. The 2 phase logic control circuit 9 also has a logic switch circuit which may switch the motor coils ØA and ØB to maintain or switch the rotation direction of the motor 2 depending on a CW command signal or a CCW command signal being inputted through the opto-isolated interface 11 so that it is possible to switch the rotation direction of the motor 2.

Still further, a control system for controlling the pump 1 according to some embodiments includes the power supply device 5 which feeds electric power. The power supply device 5 rectifies an AC voltage inputted from outside and feeds the generated DC voltage 54 to the power switch circuit 4. The power supply device 5 also feeds a gate drive voltage 53 of DC 12-15V, which is dropped by a built-in DC-DC transforming device (not shown) in the power supply device 5, to the gate drive circuit 7. Further, the power supply device 5 feeds a voltage 52 of DC 12-15V to the 2 phase logic control circuit 9. In the meanwhile, a control system for controlling the pump 1 according to some embodiments may include an isolated DC-DC power supply device 6 which is built in separately from the input of the AC voltage. A voltage of DC 12V outputted by the isolated DC-DC power supply device 6 is used as a power source for an external main system control 14 or a 19 communication device such as RS485 through the opto-isolated interface 11. This built-in type isolated DC-DC power supply device 6 configures a separate power supply device which is electrically isolated from the power supply device 5 used for a control system for controlling the pump 1 according to some embodiments. That is, because a built-in power supply device such as the isolated DC-DC power supply device 6 according to some embodiments feeds separate electric power isolated from the power supply device 5 used for a control system for controlling the pump 1 according to some embodiments, a separate external isolated power supply device to be used for accessing an electric signal of a external control device or system is not required.

Hereinbelow, various advantages will be described in more detail in case of using a control system for controlling the pump 1 according to some embodiments.

Equipment of the operation of an HVAC or a pump may be used in various indoor or outdoor environments and is generally required to be operated stably at a temperature approximately with a wide range of −40° C. to 60° C. Further, the motor 2 for an HVAC or a pump reaches at an over-heated condition, a system should not be stopped by switching the motor 2 to be operated a low speed in a safe mode before a break-down of the motor 2 occurs. In order to perform functions to satisfy the requirements described above, a control system according to some embodiments includes the microprocessor 10 having a program with specific algorithms and the temperature detection sensor 16 connected to the microprocessor 10. The temperature value of the motor 2 detected by the temperature detection sensor 20 16 becomes a pre-determined stable temperature value or more, the microprocessor 10 reduces the rotation speed or the output of the motor 2 up to 40 to 50% at its maximum by using the program with specific algorithms. Further, when the temperature value of the motor 2 detected by the temperature detection sensor 16 returns to a normal temperature, the microprocessor 10 increases gradually the rotation speed or the output of the motor 2 to its original pre-determined speed or output by using the program with specific algorithms.

Further, in case of driving the pump 1, an abnormal condition may occur, including a condition that, for example, a pump circulator is clogged abruptly or a body part of a human being may be sucked into a pump inlet, etc., especially in a swimming pool. In such case, a very dangerous abnormal condition may result in such as a break-down of a pump, or damages to body or death. When such kind of an abnormal condition occurs, the speed of the motor 2 is reduced while the load current of the motor 2 increases abruptly, or the speed of the motor 2 is increased while the load current of the motor 2 decreases significantly. The microprocessor 10 used for a control system of some embodiments receives a detection signal of the load current 81, the rotor position signal 31, the detected temperature signal of the motor 2 outputted from the temperature detection sensor 16, and the voltage variance detection signal of the DC voltage 54 outputted from the voltage detection circuit 17, and compares and calculates them and their corresponding predetermined standard values or normal values. Thus, when the operation condition of the motor changes abruptly during a normal operation thereof (i.e., when an abnormal condition occurs), the microprocessor 10 feeds the 21 variable PWM output signal to the 2 phase logic control circuit 9 depending on the compared and calculated values so that the microprocessor 10 may switch the motor 2 to stop or to be operated at a minimum operation output condition within a quick period of time.

Phase Logic Control Circuitry

Figure 3A:
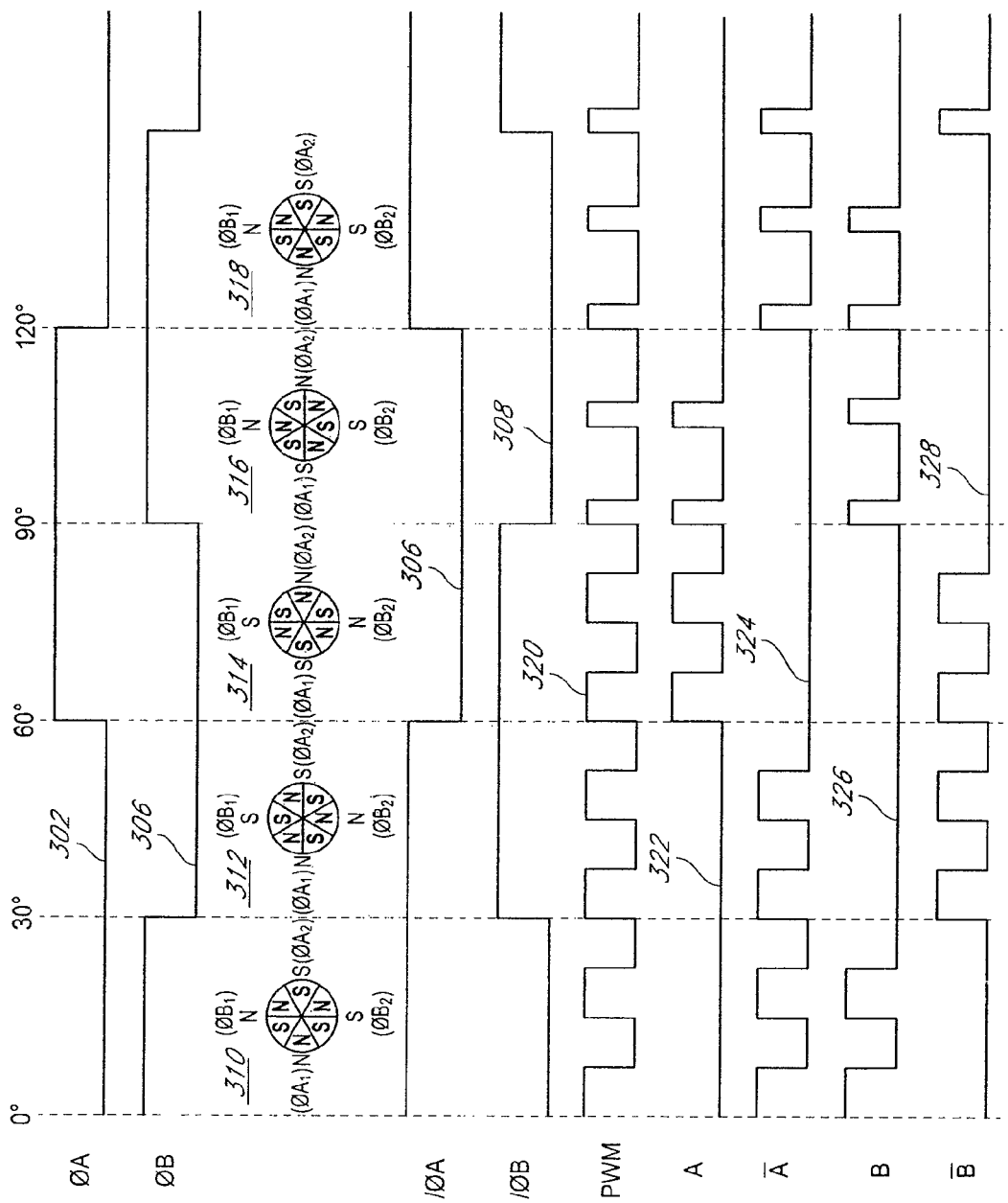
FIG. 3A illustrates a first set of example signal waveforms in the phase logic control circuit during various phases of rotation of the BLM rotor according to some embodiments.

FIG. 3A illustrates example waveforms of various signals in the phase logic control circuit 9 during different angular phases of rotation of the BLM rotor illustrated in FIG. 2A. Several different segments are delineated (by dashed vertical lines) for each of the waveforms. Each of the segments represents a specified amount of angular rotation of the rotor of the BLM illustrated in FIG. 2A. For example, the first segment (from left to right) of each waveform corresponds to the angular rotation from 0°-30° in a clockwise direction (e.g., where the position of the rotor in FIG. 2A represents the 0° starting point). In like fashion, the second segment of each waveform corresponds to the angular rotation of the rotor from 30°-60° in a clockwise direction, and so on for each of the subsequent delineated segments in 30° increments.

The signal "φA" is represented by waveform 302. φA is the output of a Hall effect sensor positioned on the BLM so as to monitor the rotational position of the rotor and to control the excitation of the φA coils in the armature, as illustrated in FIG. 2A. For example, in some embodiments, this Hall effect sensor is placed in the vicinity of either of the φA coils in the armature, though it may also be positioned elsewhere. The signal "φB" is represented by waveform 306. φB is the output of a Hall effect sensor positioned on the BLM so as to monitor the rotational position of the rotor and to control the excitation of the φB coils in the armature. For example, in some embodiments, this Hall effect sensor is placed in the vicinity of either of the φB coils in the armature, though it may also be positioned elsewhere. As illustrated in FIG. 3A, in some embodiments, the Hall effect sensors output digital signals. For example, the Hall effect sensors may output a first voltage in the presence of the field from a magnetic north pole while outputting a second voltage in the presence of the field from a magnetic south pole. In some embodiments, two Hall effect sensors are used to sense the position of the rotor. However, in other embodiments, the position of the rotor can be detected using a different number of Hall effect sensors, or by other means.

In the BLM embodiment illustrated in FIG. 2A, the rotor has six magnetic poles. As such, each magnetic north pole (N) is separated by 120° from an adjacent magnetic north pole, and each magnetic south pole (S) is separated by 120° from an adjacent magnetic south pole. The north and south magnetic poles are arranged in alternating fashion such that each magnetic north pole is separated by 60° from an adjacent magnetic south pole. By virtue of this arrangement, in some embodiments, a rotation of 120° corresponds to one period of each of the outputs φA and φB from the Hall effect sensors. For example, if a magnetic north pole starts off adjacent one of the Hall effect sensors, the output of the sensor may be "low" or "inactive." However, during 120° of angular rotation, a magnetic south pole will pass adjacent the sensor, during which time its output may transition to "high" or "active," followed by a magnetic north pole that causes the output of the sensor to transition back to low. In some embodiments, "active" may also be used in reference to "low" periods, while inactive is used in reference to "high" periods. For example, in the case of a digital signal, "active" and "inactive" periods may simply be used to refer to the alternate states of the digital signal. In some cases, "active" periods may reference intervals where a signal pulses in coordination with the speed control PWM signal 114 (or would pulse in coordination with the speed control signal if logically combined with the speed control signal, as described herein), as described herein, while "inactive" periods may reference intervals where a signal does not pulse in coordination with the speed control PWM signal 114 (or would not pulse in coordination with the speed control signal if logically combined with the speed control signal, as described herein).

As can be seen in FIG. 3A, in some embodiments, the φA and φB signals are shifted in phase relative to one another by 90°, which corresponds to 30° of angular rotor rotation. In some embodiments, the Hall effect sensors output a "high," or "active," value in the presence of a magnetic north pole and a "low," or "inactive," value in the presence of a magnetic south pole, though the converse can also be true. Other configurations are also possible depending, for example, upon the type of Hall effect sensors used. In addition, the high and low values can be reversed.

In FIG. 3A, a series of schematic representations 310, 312, 314, 316, and 318 of the rotor and stator of the BLM are shown below the signal waveforms φA 302 and 9B 306. Each of these schematics represents the state of the BLM during one of the delineated rotational phases. For example, schematic 310 represents the state of the BLM as the rotor rotates from 0°-30°. Each of the magnetic poles of the rotor is represented by a bold face "N" for a magnetic north pole or a bold face "S" for a magnetic south pole. The states of the electromagnets in the stator are represented in a similar manner (but are not in bold face), where φA1 and φA2 are the first and second electromagnets of the φA grouping, and φB1 and φB2 are the first and second electromagnets of the φB grouping. Schematics 312, 314, 316, and 318 represent the state of the BLM during subsequent 30° angular phases of rotation.

As illustrated by schematics 310 and 312, magnetic pole φA1 of the stator is energized as a magnetic north pole during the rotation of the rotor from 0°-60°. After 60° of rotation, the current through magnetic pole φA1 is reversed so as to create a magnetic south pole. A similar pattern can be noted for each of the electromagnets in the stator wherein the polarity of each of the electromagnets is reversed every 60° of rotation. It can be seen from the schematics 310, 312, 314, 316, and 318 that this pattern according to which the electromagnets in the stator are energized creates magnetic fields that interact with the magnets of the rotor to cause a rotational force. Again, the transitions of the φA and φB coils are offset by 90°, which corresponds to 30° of angular rotor rotation. The direction of this offset, whether forward or backward in time, determines whether the rotor rotates in a clockwise fashion or a counterclockwise fashion.

The phase logic circuit 9 receives the φA and φB outputs from the Hall effect sensors as inputs. In general, the phase logic circuit 9 creates output signals, based on these inputs, which are used to properly phase the timing and direction of energizing current through the stator electromagnets (i.e., φA1, φA2, φB1, and φB2) so as to achieve rotor rotation. For example, for the BLM illustrated in FIG. 2A, the phase logic circuit 9 energizes one of the φA electromagnets to serve as a north magnetic pole while the other is energized as a south magnetic pole (e.g., by oppositely wrapping the two φA electromagnets) for 60° of angular rotation of the rotor. Similarly, the phase logic circuit 9 energizes one of the φB electromagnets to serve as a north magnetic pole while the other is energized as a south magnetic pole (e.g., by oppositely wrapping the two φB electromagnets) for a period of 60° of angular rotation, but a 60° period of angular rotation that is 90° out of phase (which corresponds to 30° of angular rotation of the rotor) with the signals to the φA electromagnets. This can be seen by reference to the schematics 310, 312, 314, 316, and 318 in FIG. 3A. After each 60° period of angular rotation, the magnetic polarity of the φA electromagnets is switched, as is the magnetic polarity of the φB electromagnets.

The phase logic circuit 9 also receives a PWM speed control input from the microprocessor 10. In some embodiments, The PWM input signal is used to create a train of pulses that energize each of the electromagnets of the stator. The duty cycle of the pulses that energize the electromagnets can be varied so as to change the average current through each of electromagnets thereby varying the rotational force applied by each electromagnet and, thus, the speed of rotation of the rotor. As described herein, the microprocessor 10 can control the duty cycle of the PWM signal 320 based on inputs related to, for example, the speed, the torque, or the temperature of the BLM.

Figure 4A:
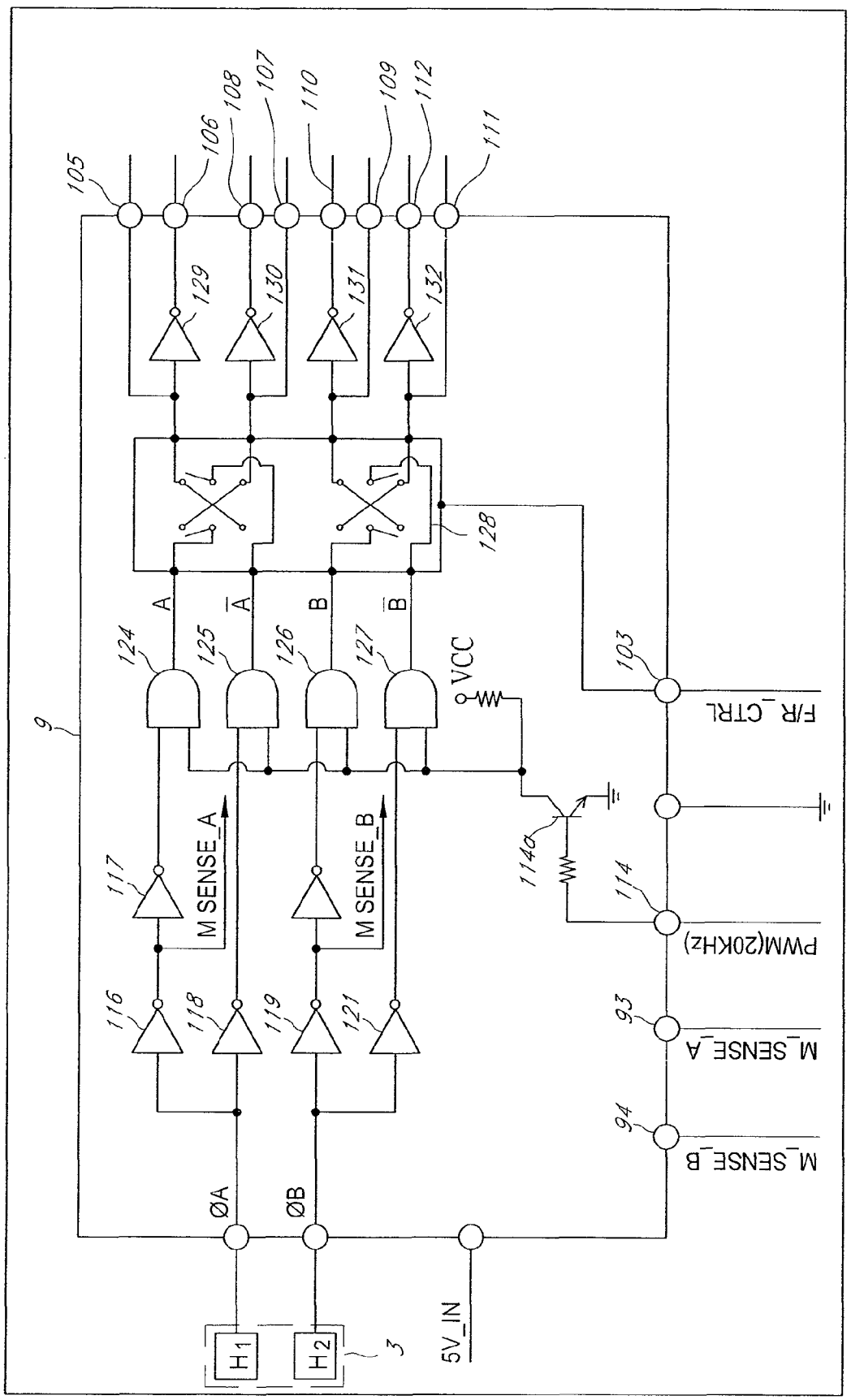
FIG. 4A is a view of a first 2 phase logic control circuit being used in some embodiments.

FIG. 4A is a view of a phase logic control circuit 9 used in some embodiments. The illustrated phase logic control circuit can be used, for example, to control BLMs such as the 2+3 motor of FIG. 2A (a 2 phase armature combined with a 3 phase rotor) and the 2 phase motor of FIG. 2B. Referring to FIG. 4A, the phase logic control circuit 9 receives inputs from two Hall effect sensors (H1, H2). These inputs from the Hall effect sensors are φA and φB, which are illustrated as waveforms 302 and 306, respectively, in FIG. 3A. The φA and φB signals are each passed through an inverter, resulting in waveforms /φA and /φB, which are the logical complements of φA and φB and are represented by waveforms 304 and 308, respectively. In particular, φA is passed through inverter 118 to create /φA, while the original φA signal is passed through the series combination of inverters 116 and 117 with no net change in the digital φA signal. In a like manner, the φB signal is transformed to a φB signal and its complement, a /φB signal, via inverters 119, 120, and 121. In some embodiments, inverters 116, 117, 119, and 120 may be dispensed with. Moreover, in some embodiments the complements of the φA and φB signals may be obtained in a different fashion, or may be sensed directly from the BLM with one or more additional Hall effect sensors positioned on the BLM.

In some embodiments, the φA, /φA, φB, and /φB signals are logically combined with the PWM speed control signal 114. For example, in some embodiments, a Boolean logical operation is performed to combine each of the φA, /φA, φB, and /φB signals, whether separately or collectively, with the PWM speed control signal 114. Such a Boolean logical operation can be formed using, for example, logical AND, OR, NOR, NAND, and/or XOR gates, or combinations thereof. In the embodiment illustrated in FIG. 4A, the φA, /φA, φB, and /φB signals are inputted into first input ports of logical AND gates 124-127. The second input port of each of the AND gates 124-127 receives the PWM speed control signal that is inputted to the phase logic control circuit 9 at port 114 from the microprocessor 10. The PWM signal is represented by waveform 320 in FIG. 3A. The microprocessor 10 can vary the duty cycle of the PWM signal in order to vary the rotational speed of the BLM in response to input signals described herein. In some embodiments, the frequency of the PWM signal is 20 kHz or greater. However, in other embodiments the frequency of the PWM signal may be less than 20 kHz. It should be understood that FIG. 3A is not intended to specify any particular frequency of the PWM signal 320 relative to the φA signal 302 and the φB signal 306 from the Hall effect sensors.

The outputs from the AND gates 124-127 are signals A, $\overline{A}$, B, and $\overline{B}$, respectively. Signal A is represented by waveform 322 in FIG. 3A. As illustrated, signal A is "high" whenever both the φA and the PWM signals are "high." Signals $\overline{A}$, B, and $\overline{B}$ are similarly represented by waveforms 324, 326, and 328, respectively.

Figure 4B:
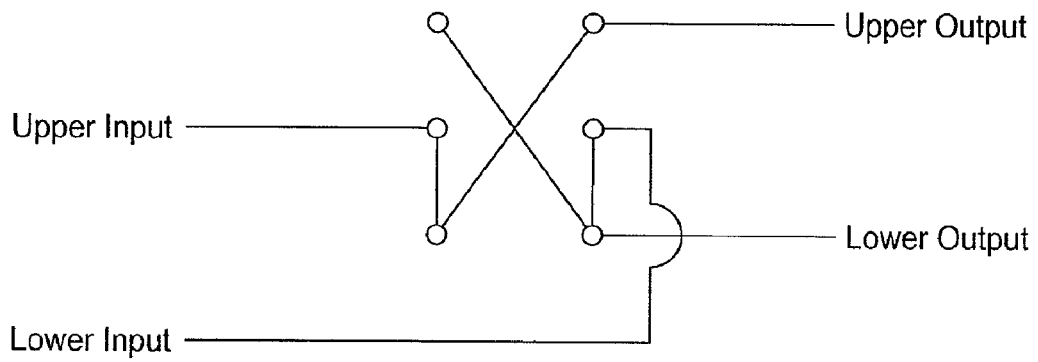
FIG. 4B illustrates two states of a logic switch used to control the direction of rotation of a BLM.
Figure 4B:
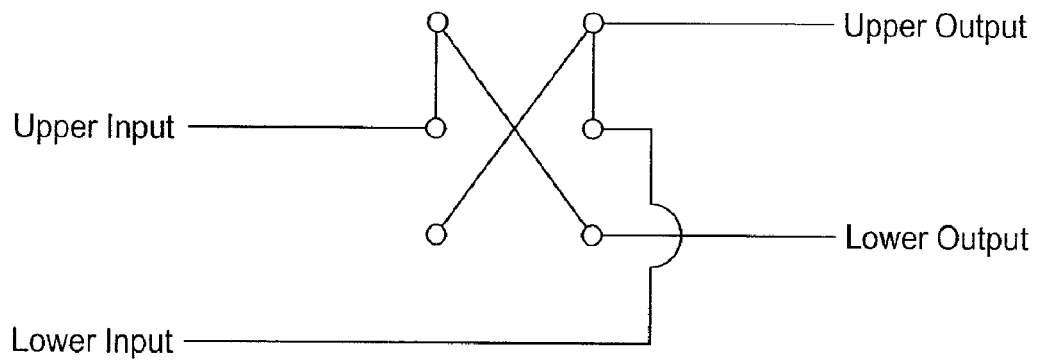

Each of the signals A, $\overline{A}$, B, and $\overline{B}$ is inputted into a four-row logic switch 128. The four-row logic switch 128 may be embodied by, e.g., the 74HC241 IC available from Philips Semiconductors. The four-row logic switch 128 has two states which are controlled by the F/R_CTRL signal from the microprocessor 10. As discussed herein, the F/R_CTRL signal controls whether the rotor of the BLM rotates in a clockwise or a counterclockwise fashion. The two states of the four-row logic switch 128 are illustrated in FIG. 4B. FIG. 4B illustrates one half of the logic switch 128 while in the first state and while in the second state. In the first state, the upper input of the top half of the logic switch (i.e., the input tied to the output of AND gate 124) is coupled to the upper output, while the lower input of the top half of the logic switch (i.e., the input tied to the output of AND gate 125) is coupled to the lower output. As described herein, the outputs of the logic switch are used to control gate drive circuitry 7 and power switches 4, which in turn drive the armature coils of the BLM stator.

When the F/R_CTRL signal is operated to place the logic switch 128 in the second state, the upper input of the top half of the logic switch (i.e., the input tied to the output of AND gate 124) is coupled to the lower output, while the lower input of the top half of the logic switch (i.e., the input tied to the output of AND gate 125) is coupled to the upper output. This reversal causes the phase offset between the φA and the φB windings of the armature to be reversed, resulting in the reversal of the direction of rotation of the rotor.

Signals A, $\overline{A}$, B, and $\overline{B}$ are outputted from the phase logic control circuit 9. The complements of each of these signals are formed by a second group of inverter gates 129-132 and are also outputted. Thus, the outputs of the phase logic circuit 9 are A, $\overline{A}$, B, and $\overline{B}$, and their complements /A, /$\overline{A}$, /B, and /$\overline{B}$. These signals are then passed to gate drive circuitry 7. Further, in some embodiments, the phase logic control circuit 9 has an output signal M_SENSE_A at port 93, and an output signal M_SENSE_B at port 94. The signals correspond to outputs from the Hall effect sensors 3 and may be used by the microprocessor 10 to obtain the rotational speed of the rotor of the BLM. In other embodiments, these signals are inputted to the microprocessor 10 directly from the Hall effect sensors. Also, in some embodiments other means may be used to obtain the rotational speed of the rotor of the BLM.

Figure 4C:
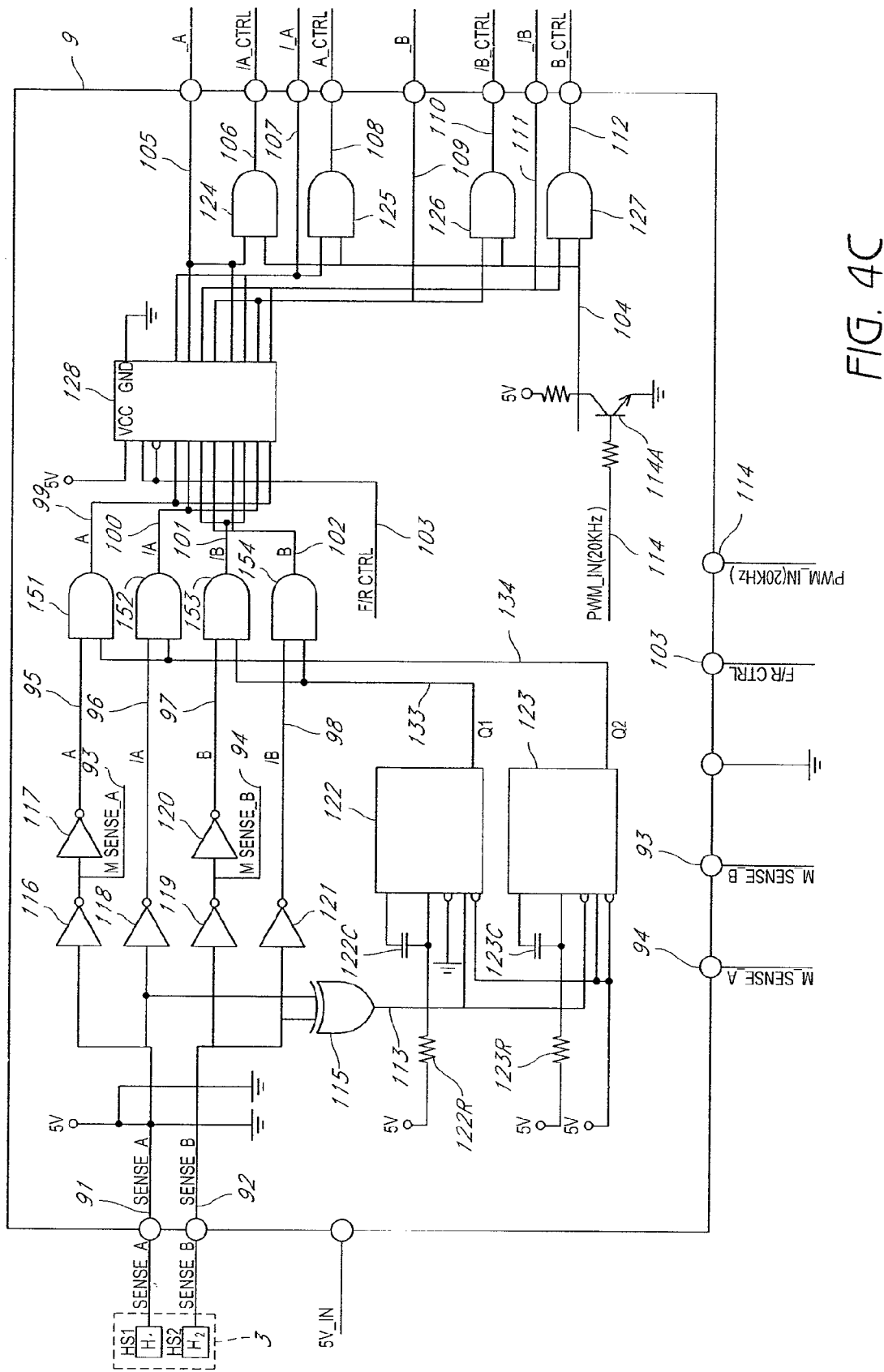
FIG. 4C is a view of a second 2 phase logic control circuit being used in some embodiments.

FIG. 4C illustrates a second embodiment of the phase logic control circuitry 9, which includes time delay logic. In FIG. 4C, as in FIG. 4A, the phase logic control circuit 9 receives inputs from first and second Hall effect sensors 3. The phase logic control circuit 9 also includes inverters 116-121, the PWM signal 114, logical AND Gates 124-127, and the four-row logic switch 128. Each of these components has a function in the phase logic control circuit 9 illustrated in FIG. 4C that is similar to what is described herein with reference to FIG. 4A. In addition, the phase logic control circuit 9 of FIG. 4C includes a logical XOR gate 115, pulse generators 122, 123, and logical AND Gates 151-154.

The logical XOR gate 115 receives the signals φA and φB from the Hall effect sensors as inputs. The output of the logical XOR gate 115 is tied to inputs of pulse generators 122, 123. In some embodiments, the output of the XOR gate 115 is a frequency-doubled, and possibly phase-shifted, version of the φA and φB rotor position signals. The pulse generators 122, 123 can be embodied by the 74HC123 IC available from Philips Semiconductors. The output of the first pulse generator 122 is tied to an input of each of the logical AND gates 151, 152. Likewise, the output of the second pulse generator 123 is tied to an input of each of the logical AND gates 153, 154. The outputs of the logical AND gates 151-154 are tied to the inputs of the four-row logic switch 128, whose outputs are each ANDed with the PWM signal 114 by the logical AND gates 124-127.

FIG. 3B illustrates a set of example waveforms from the phase logic control circuitry 9 illustrated in FIG. 4C. Waveforms 91 and 92 represent the Hall effect sensor signal inputs φA and φB, respectively. As described herein, in some embodiments the φA and φB signals are 90° (which corresponds to 30° of angular rotation of the rotor of the 2+3 BLM of FIG. 2A) out of phase with one another. The EXOR signal 113 is high whenever either the φA or the φB is high but not both. The EXOR signal 113 is inputted to the pulse generators 122, 123, which have outputs Q1 133 and Q2 134, respectively. As illustrated in FIG. 3B, in some embodiments, the pulse generators 122, 123 generate either a high or low pulse in response to the transition edges of the EXOR signal 113. For example, the first pulse generator 122 generates low pulses in response to the positive transitions, or rising edges, of the EXOR signal 113, and the second pulse generator 123 generates low pulses in response to the negative transitions, or falling edges, of the EXOR signal 113. In some embodiments, the time duration of the low pulses generated by the first and second pulse generators 122, 123 is in the range from approximately 200 us to approximately 600 us, though other durations are also possible and may be advantageous in some embodiments. In some embodiments, the parameters of the pulse generators 122, 123 can be varied so as to control the width of the transition period. One purpose of the pulses generated by the pulse generators 122, 123 is to create a transition period between the signals that control the first and second full bridge configurations of switches so as to reduce back EMF and back torque caused by the prior rise-up and prior fall-down of the motors rotating magnetic field. In addition, the transition period helps to avoid a short circuit fault condition in the full bridges, as described herein. The transition period may also improve forward EMF and/or avoid a magnetic deep loss point. While FIG. 4C illustrates one embodiment of circuitry for performing these functions, they can also be performed by different circuitry, at a different location in the signal flow of the circuit, or both. In some embodiments, the length of the pulses generated by the first and second pulse generators 122, 123 is less than about ¼ of a period of the EXOR signal 113, or less than about ⅛, or less than about ¹⁄₁₆ of a period of the EXOR signal 113. In some embodiments, the transition period is appreciably longer than settling times of power switches that are used to drive the electromagnets of the BLM.

The outputs of the first and second pulse generators 122, 123 are ANDed together with the φA, /φA, φB, and /φB signals using the logical AND gates 151-154, as illustrated in FIG. 4C. the outputs of the logical AND gates 151-154 are the A' signal 99, the $\overline{A'}$ signal 100, the $\overline{B'}$ signal 101, and the $\overline{B'}$ signal 102. The A' signal 99 corresponds generally to the φA signal 91 but with active periods that have been shortened by the width of the pulse generated by pulse generator 122. The $\overline{A'}$ signal 100 corresponds generally to the /φA signal 96 but, again, with active periods that have been shortened by the width of the pulse generated by the pulse generator 122. The same is true regarding the B' signal 101, and the $\overline{B'}$ signal 102 with respect to the φB signal 92 and in the /φB signal 98. As illustrated in FIG. 3B, the XOR gate 115, the pulse generators 122, 123, and the AND gates 151-154 temporally space active periods of, for example, the rotor position signal φA and its logical complement. The same is true with regard to temporally spacing active periods of the rotor position signal φB and its logical complement. This results in temporal spacing of forward polarity and reverse polarity drive pulses in the signals of FIG. 3B labeled 41-42(PWM) and 43-44(PWM), as described herein.

The A' signal 99, the $\underline{A'}$ signal 100, the B' signal 101, and the B' signal 102 are transmitted to the logical AND gates 124-127 by way of the four-row logic switch 128. The PWM signal 114 is then ANDed with each of these signals by the logical AND gates 124-127 in order to create pulse trains, as described herein. Ultimately, these signals control the first and second configurations of full bridge switches (i.e., F1-F8), which drive the electromagnets of the BLM, as described herein.

While FIGS. 4A and 4C each show that the speed control PWM signal 114 is logically combined with the BLM rotor position signals φA and φB with logical AND gates (e.g., 124-127), other types of logic gates can also be used. For example, in some embodiments, the logical AND gates 124-127 of FIGS. 4A and 4C can be replaced with logical NOR gates. In these embodiments, for example, signals A and B consist of positive pulses that correspond to the PWM signal 114 whenever signals φA and φB are respectively low, and signals A and B are low whenever signals φA and φB are respectively high. In addition, in some embodiments, the logical AND gates 124-127 can be replaced with logical OR gates or with logical NAND gates. In these embodiments, for example, signals A and B consist of intervals of negative pulses that correspond to the PWM signal 114. These intervals of pulses are separated by high signal intervals instead of low signal intervals, as in the case where AND gates or NOR gates are used. Other types and/or combinations of logic gates can be used to combine the rotor position signals φA and φB with the speed control PWM signal 114.

Depending upon the particular logic gates used in a given embodiment, the gate drive circuitry (e.g., gate-dedicated ICs 71-74) may require modification (e.g., to compensate for intervals of pulses separated by high intervals instead of low intervals, as in the illustrated embodiments of FIGS. 4A and 4C) to appropriately control the power switches using the drive signals that result from the logical combination of the rotor position signals and the speed control PWM signal. However, these modifications can be performed by a person having ordinary skill in the art based on the disclosure provided herein.

In some embodiments, the phase logic control circuitry 9 is implemented as a single integrated circuit, or chip, such as an Application Specific Integrated Circuit (ASIC). For example, all of the circuitry illustrated in FIG. 4C may be embodied in a single integrated circuit. In some embodiments, the phase logic control circuitry 9, excluding the four-row logic switch 128 and/or the pulse generators 122, 123 is implemented as a single integrated circuit, or chip, such as an Application Specific Integrated Circuit (ASIC). In some embodiments of the BLM circuitry, the phase logic control circuitry and the gate drive circuitry are implemented as a single integrated circuit, or chip, such as an Application Specific Integrated Circuit (ASIC).

Gate Drive Circuitry

Figure 5A:
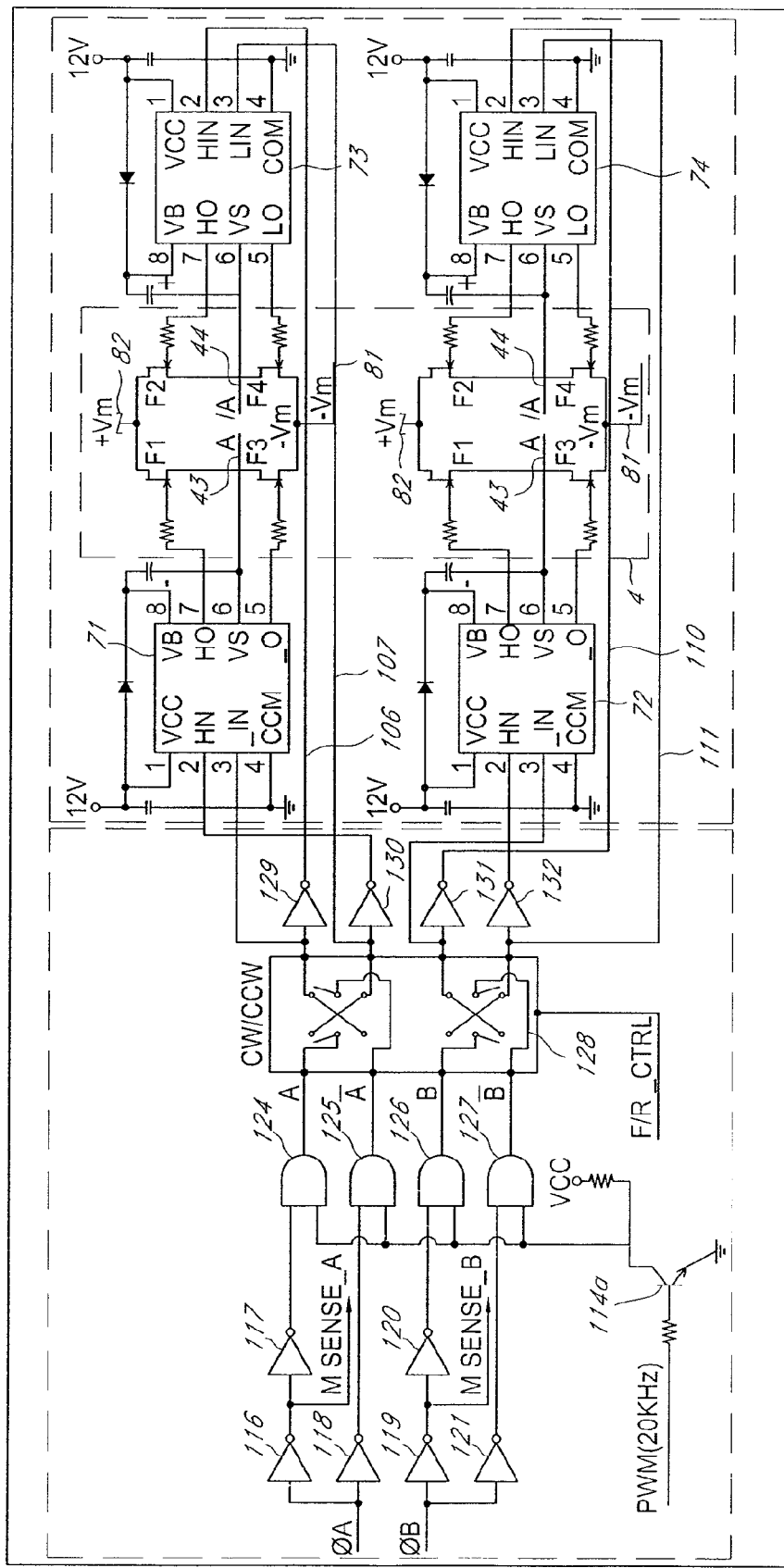
FIG. 5A is a detailed view of a first power switch circuit being used in some embodiments.

The outputs A, $\overline{A}$, B, and $\overline{B}$, and their complements /A, /$\overline{A}$, /B, and /$\overline{B}$, from the phase logic circuit 9 are passed to gate drive circuitry 7, which interfaces between the phase logic circuit 9 and two separate full bridge configurations of power switches 4 that drive the φA and φB electromagnets of the BLM. Although the signals A, $\overline{A}$, B, and $\overline{B}$, and their complements /A, /$\overline{A}$, /B, and /$\overline{B}$, are those that are physically passed to the gate drive circuitry 7 and can be considered drive signals, the signals at various different points in FIGS. 4A and 4C can likewise be considered as drive signals. The gate drive circuitry 7 and the power switches 4 are illustrated in FIG. 5A. Referring to FIGS. 4A and 5A, the outputs 105, 106, 107, and 108 of the 2 phase logic control circuit 9 are respectively connected to first gate-dedicated ICs 71, 73 for driving full bridge switches F1, F2, F3, and F4 which power the φA electromagnets (e.g., those illustrated in FIG. 2A), while the outputs 109, 110, 111, and 112 are connected to second gate-dedicated ICs 72, 74 for driving full bridge circuits F5, F6, F7, and F8 of the φB electromagnets (e.g., those illustrated in FIG. 2A). The gate-dedicated ICs may be embodied by, e.g., the IRS2106 IC available from International Rectifier.

In some embodiments, each of F1-F8 is a field effect transistor (FET). However, other types of switching devices, such as insulated-gate bipolar transistors, for example, may also be used. Switches F1-F4 are arranged in a first full bridge configuration that drives the φA electromagnets, while switch is F5-F8 are arranged in a second full bridge configuration that drives the φB electromagnets. In other embodiments, half bridge configurations of switches may be used. The outputs 105, 106, 107, and 108 of the phase logic control circuit 9 switch the first full bridge (F1-F4) and the outputs 109, 110, 111, and 112 of the phase logic control circuit 9 switch the second full bridge (F5-F8). The outputs 41, 42 are fed to the φA armature windings, while the outputs 43, 44 are fed to the φB armature windings. These outputs drive the BLM in the manner described herein. The BLM may be embodied by a 2 phase and 3 phase combined type brushless BLM (FIG. 2A) or a conventional 2 phase brushless BLM (FIG. 2B).

Figure 5B:
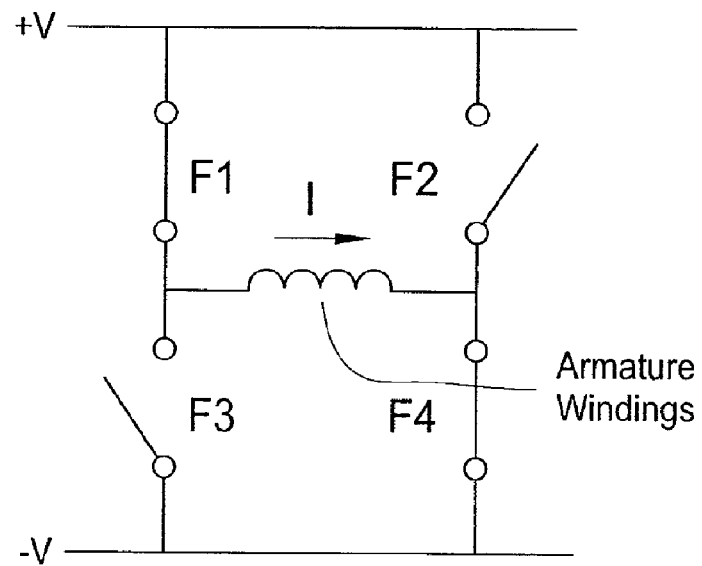
FIG. 5B illustrates two states of a full bridge circuit used to supply power to the armature windings of a BLM.
Figure 5B:
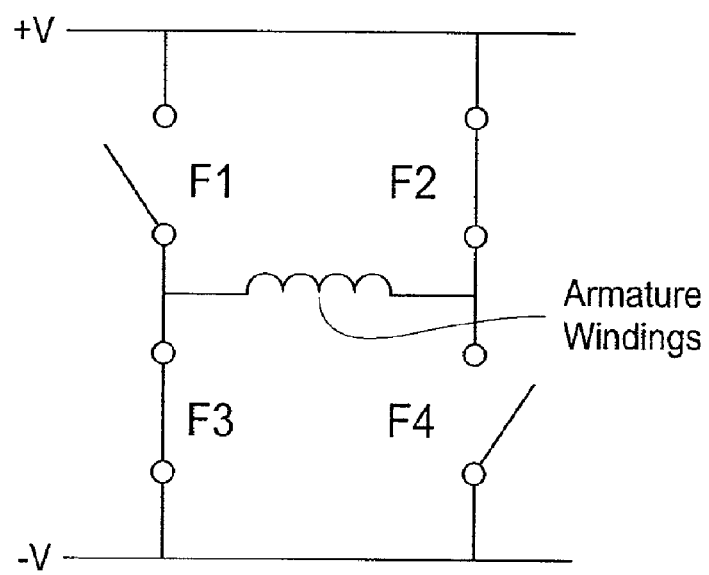

FIG. 5B illustrates two states of one of the full bridge circuits used to supply power to the armature windings of a BLM. For example, as illustrated in FIG. 5B, the signals A, $\overline{A}$, /A, and /$\overline{A}$ control the full bridge arrangement of switches that includes F1-F4 (by way of gate drive circuitry 7). Signals A and $\overline{A}$ are illustrated in FIG. 3 as waveforms 322 and 324. While signals /A and /$\overline{A}$ are not explicitly illustrated in FIG. 3, they are the complements of signals A and $\overline{A}$ and can be easily derived from waveforms 322 and 324. Signals A, $\overline{A}$, /A, and /$\overline{A}$ are coupled to the gate drive circuitry 7 and the power switches 4 in such a manner as to alternate the first full bridge of switches F1-F4 between the two states illustrated in FIG. 5B. For example, while in the first state, the full bridge allows current to flow from a power source through the φA electromagnets in a first direction. Conversely, current is permitted to flow from a power source to the φA electromagnets in a second direction when the full bridge F1-F4 is in the second state. This reversal of the direction of current reverses the magnetic polarity of the φA electromagnets in the stator. Signals B, $\overline{B}$, /B, and /$\overline{B}$ control the second full bridge of switches F5-F8 in a similar manner.

As described herein, in some embodiments of the BLM illustrated in FIG. 2A, the magnetic polarity of the φA electromagnets is switched every 60° of angular rotation of the rotor. The same is true of the φB electromagnets but at a timing 90° out of phase with the φA electromagnets (which corresponds to 30° of angular rotation of the rotor). It should be understood, however, that the phase control logic 9, the gate drive circuitry 7, and the power switches 4 illustrated in FIGS. 4A, 4C, 5A, and 5C can also be used with different BLMs, such as, for example, the two phase motor illustrated in FIG. 2B. When used with the two phase motor illustrated in FIG. 2B, the input signals from the Hall effect sensors would be somewhat altered (e.g., their frequencies, phase relationships, etc.) owing to the different angular relationships between the magnetic poles of the rotor, which would affect the excitation of the φA and the φB electromagnets. However, the circuitry itself for controlling the BLM of FIG. 2B can be substantially the same as the circuitry that has been described for controlling the BLM of FIG. 2A.

In some embodiments, each of signals A, $\overline{A}$, /A, /$\overline{A}$, B, $\overline{B}$, /B, and /$\overline{B}$ consists of a train of pulses. The duty cycles of these pulses varies according to the duty cycle of the PWM signal 320. As described herein, the duty cycles of these pulses can be varied to change the average current through the armature windings of the BLM as a means to control the rotational speed of the rotor.

Figure 5C:
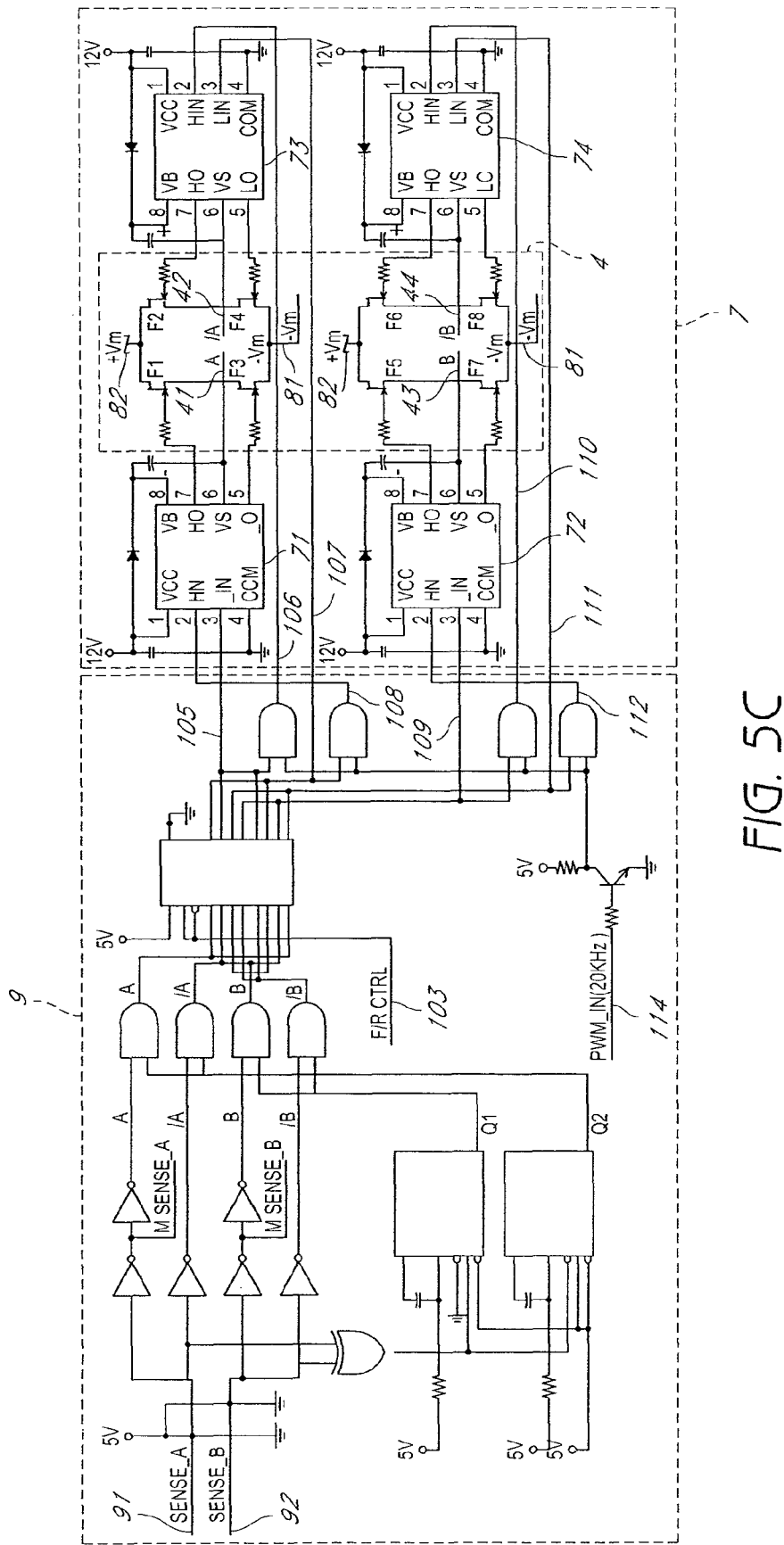
FIG. 5C is a detailed view of a second power switch circuit being used in some embodiments.

FIG. 5C illustrates the gate drive circuitry 7 and the power switches 4 that are controlled by the phase logic control circuit 9 of FIG. 4C. The gate-dedicated ICs 71-74 and the power switches F1-F8 operates similarly to what is described herein with respect to FIG. 5A. FIG. 3B illustrates the output of the first full bridge configuration of switches, which is waveform 41-42(PWM). The signal is made up of a train of positive voltage pulses which energize the electromagnets of the BLM with current in a first direction. The positive pulses are followed by a low voltage (e.g., zero voltage) transition period, which is created using the pulse generator 122. In some embodiments, the transition period is appreciably longer than the settling times of the power switches so as to provide a sufficient safety margin between the switching off of one pair of switches in the full bridge and the switching on of the other pair of switches. The safety margin avoids a fault condition where a direct path from the positive voltage power supply to the negative voltage power supply could exist. The transition period is then followed by a train of negative voltage pulses which energize the electromagnets of the BLM with a current in a second direction, opposite from the first. These negative pulses are followed by another transition period and another train of positive pulses, etc. The output of the second full bridge configuration of switches (F5-F8) is similarly illustrated in FIG. 3B as waveform 43-44(PWM). As described herein, in some embodiments, the output of the second full bridge configuration of switches is 90° out of phase with the output of the first full bridge configuration of switches (which corresponds to 30° of angular rotation of the rotor of the BLM).

Figures 1, 6:
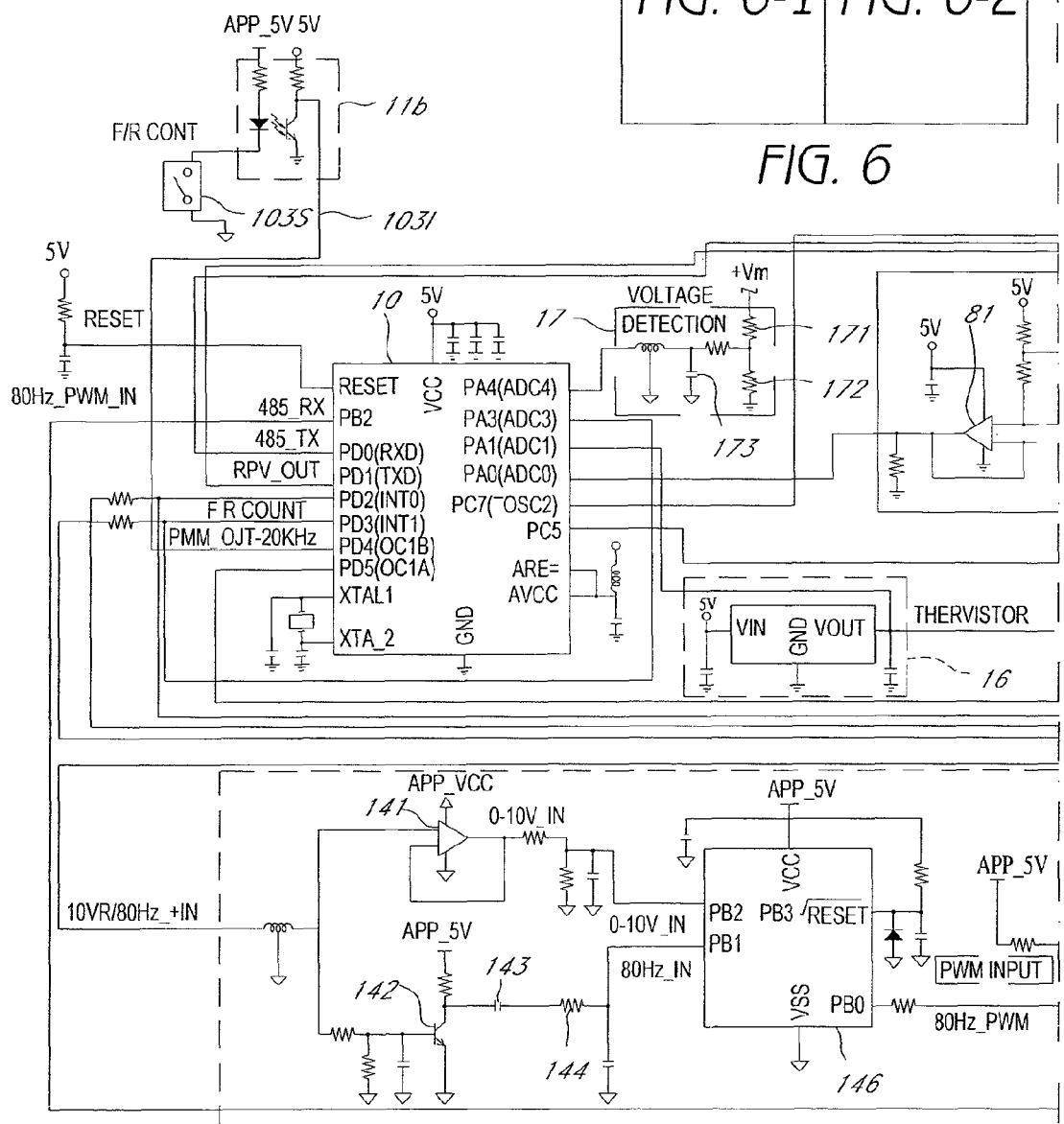
FIG. 6 is a detailed circuit view of a control system being used in one embodiment.
Figures 2, 6:
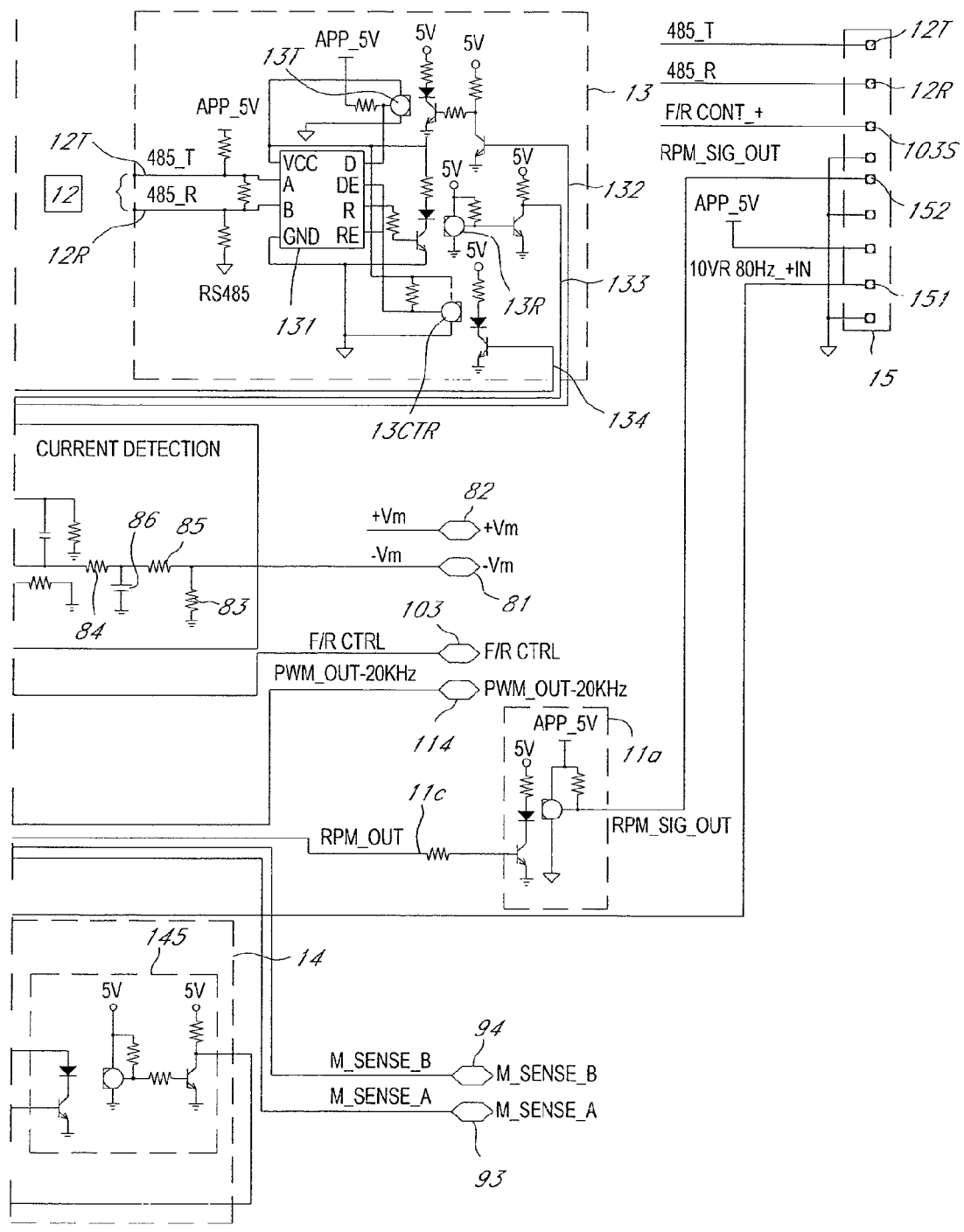

FIG. 6 is a detailed circuit view of a control system being used in some embodiments.

Referring to FIGS. 1 and 6, pre-determined data of a plurality of operation control commands from the factory program device 12, where the pre-determined data are stored, are inputted into RS485 13 of some embodiments. RS485 13 includes RS485 communication IC chip 131 having a transmitting line 12T and a receiving line 12R capable of communicating with the factory program device 12. The transmitting and receiving outputs of RS485 13 and the signal control (CTR) outputs are respectively inputted into the microprocessor 10 through opto-isolation couplers 13T, 13R, and 13CTR. A switch 103S is a means for changing a rotational direction of the motor 2 by simple on-off operation and is connected to ground. A High (H) or Low (L) signal 103I by this switch 103S is inputted into the microprocessor 10 through an opto-isolation coupler 11b. The H or L signal 103I is inputted during an operation, the microprocessor 10 waits for a certain period of time until it identifies that the rotation of the motor 2 almost stops. Thereafter, the microprocessor 10 transmits a control signal for switching a rotational direction, as a switching input 103, to the 2 phase logic control circuit 9.

In the meantime, a DC voltage +Vm applied to the motor 2 is divided by resistance 171 and resistance 172 in the voltage detection circuit 17. A divided voltage is again smoothened by a condenser 173 and the smoothened voltage is inputted into the microprocessor 10. Resistance 83 is 24 connected to between the power switch circuit 4 and ground voltage −Vm. A voltage across both ends of the resistance 83, which is proportional to a current value flowed in the power switch 4, passes through a integral filter circuits 84, 85, and 86 and is inputted into a voltage comparison amplifier 81. The output of the voltage comparison amplifier 81 is inputted into the microprocessor 10 and then the microprocessor 10 calculates a load current value of the motor 2.

The temperature detection sensor 16, which may be embodied by a transistor or a thermistor for outputting a voltage signal proportional to a temperature, may be mounted on a case or an armature of the motor 2. The output signal of the temperature detection sensor 16 is inputted into the microprocessor 10, and the microprocessor 10 may transmit a signal for indicating an abnormal condition of the motor 2 to the relay switch 18. The relay switch 18 may be embodied by a switch where a contact point of a circuit is switched in an on-off manner. The microprocessor 10 also transmits a rotation speed data signal 11c of the motor 2 to a connection port 152 of the central control system 15 through the opto-isolation coupler 11a.

In some embodiments, anyone of the DC voltage signal (0-10 Vdc) 151 or the PWM signal 151 for controlling the speed of the motor 2 from the central control system 15 is inputted into the opto-isolated speed command signal processing interface 14 through one port. In case that the DC voltage signal (0-10 Vdc) 151 for controlling the speed of the motor 2 is inputted, the DC voltage signal (0-10 Vdc) 151 for controlling the speed of the motor 2 is transmitted to an input PB2 of the microprocessor 10 through a linear amplifier 141. In case that the PWM signal 151 for controlling the speed 25 of the motor 2 is inputted, the PWM signal 151 for controlling the speed of the motor 2 is outputted through a transistor 142 and then passes through a differential circuits 142,143, and 144, each of which is comprised of a condenser 143 and resistance 144, and then is transmitted to an input PB1 of a second microprocessor 146. Therefore, the opto-isolated speed command signal processing interface 14 of some embodiments may process the DC voltage signal (0-10 Vdc) 151 and the PWM signal 151 for controlling the speed of the motor 2, respectively. For this purpose, the second microprocessor 146 includes a program having algorithms, which outputs a PWM output signal where a width of the PWM output signal with a specific frequency (e.g., 80 Hz) is exactly modulated in proportion to a rate (0-100%) of voltage with a range of 0 to 10 Vdc in case of the DC voltage signal (0-10 Vdc) 151 for controlling the speed of the motor 2, while outputs a PWM output signal where a width of the PWM output signal with a specific frequency (e.g., 80 Hz) is exactly modulated in proportion to a pulse width modulation rate (0-100%) in case of the PWM signal 151 for controlling the speed of the motor 2. The output of the second microprocessor 146 is connected to the input 80 Hz_PWM_IN of the microprocessor 10 through the opto-isolation coupler 145.

In the microprocessor 10 and the logic control circuit 9 being used in a control system of a motor for the pump 2 according to some embodiments, not only various operations, which are required when controlling the motor 2, may be selected as described in detail above, but also data information relating to operation current, voltage, speed, and temperature which are processed by the microprocessor 10 is possible to be transmitted to 26 an external system (e.g., a monitor, a personal computer, or a data recording device, etc.) through either RS485 13 connected to the microprocessor 10 or a separate communication device. As a result, logging the operation-related data information described above is available so that it is possible to monitor any troubles, operation efficiency, and a condition on a stable operation of an HVAC or a pump in real time by analyzing the operation conditions through 24 hours.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the invention should not be limited by any of the above-described exemplary embodiments, but should be defined only in accordance with the following claims appended hereto and their equivalents.

What is claimed is:

1. An electric motor comprising:
   windings;
   a power supply circuit configured to convert an electric power input to a first electric power, a second electric power and a third electric power;
   a logic circuit powered with the first electric power and configured to provide logic signals;
   a power switching circuit configured to supply the second electric power to the windings based on the logic signals;
   an interface circuit powered with the third electric power and configured to interface between internal circuits of the electric motor and one or more devices external to the electric motor; and
   wherein the third electric power is electrically isolated from the first and second electric powers, wherein the interface circuit is electrically isolated from the internal circuits and optically connected to the internal circuits so as to provide data communication between the internal circuits and the one or more external devices via optical connection to the internal circuits.

2. The motor of claim 1, wherein the interface circuit is configured not to receive an electric power other than the third electric power.

3. The motor of claim 1, wherein the electric power input is an AC power input.

4. The motor of claim 1, wherein the power supply circuit comprises a DC/DC converter configured to supply the third electric power to the interface circuit.

5. The motor of claim 1, wherein the third electric power has voltage of about 12 volts.

6. The motor of claim 1, wherein the first electric power has voltage of 12-15 volts.

7. The motor of claim 1, further comprising an opto-isolator configured to optically connect the interface circuit and the internal circuits of the electric motor.

8. The motor of claim 1, further comprises a microprocessor which is optically connected to the interface circuit and configured to receive data via the interface circuit from one of the one or more devices external to the electric motor.

9. The motor of claim 8, wherein the microprocessor is configured to receive at least one operation control command selected from the group consisting of a non-regulated speed control (NRS) command, a regulated speed control (RS) command, a constant torque control command, a constant air flow control command, a clockwise rotation command and a counter-clockwise (CCW) rotation control command.

* * * * *

UNITED STATES PATENT AND TRADEMARK OFFICE
CERTIFICATE OF CORRECTION

| | | |
|---|---|---|
| PATENT NO. | : 8,049,447 B2 | Page 1 of 1 |
| APPLICATION NO. | : 12/901412 | |
| DATED | : November 1, 2011 | |
| INVENTOR(S) | : Young-Chun Jeung | |

It is certified that error appears in the above-identified patent and that said Letters Patent is hereby corrected as shown below:

In the Drawings, Sheet 1 of 13, in FIG. 1, please change "M/CRO" to --MICRO--.

In the Drawings, Sheet 12 of 13, in FIG. 6-1, please change "THERVISTOR" to --THERMISTOR--.

In Column 5, Line 42, please change ""434 patent")" to --'434 patent)--.

In Column 5, Line 64, please change "refereed" to --referred--.

In Column 6, Line 10, please change "optoisolate" to --opto-isolated--.

In Column 6, Line 30, please change "detail between the" to --detail.--.

In Column 6, Line 35, please change "the an" to --the--.

In Column 6, Line 53, please change "optoisolated" to --opto-isolated--.

In Column 8, Line 40, please change "detain" to --detail--.

In Column 8, Line 61, please change "an opto-isolated" to --opto-isolated--.

In Column 9, Line 16, please change "ort" to --or--.

In Column 11, Line 64, please change "9B" to --ɸB--.

In Column 13, Line 3, please change "ɸA and ɸB," to -- /ɸA and /ɸB,--.

In Column 15, Line 29, please change "the outputs" to --The outputs--.

In Column 15, Line 30, please change " $\overline{B'}$ " to -- $B'$ --.

In Column 15, Line 48, please change " $\frac{A'}{}$ " to -- $\overline{A'}$ --.

In Column 15, Line 49, please change " $\frac{B'}{}$ " to -- $\overline{B'}$ --.

In Column 17, Line 47, please change " $\frac{A,}{}$ " to -- $\overline{A}$ ,--.

In Column 19, Line 11, please change "142,143," to --142, 143--.

Signed and Sealed this
Twenty-fifth Day of September, 2012

David J. Kappos
*Director of the United States Patent and Trademark Office*